(12) United States Patent
Matsumoto et al.

(10) Patent No.: US 7,736,253 B2
(45) Date of Patent: Jun. 15, 2010

(54) GEAR-SHIFTING APPARATUS FOR A BICYCLE, AND BICYCLE INCORPORATING SAME

(75) Inventors: Shinya Matsumoto, Saitama (JP); Kazunari Iguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1366 days.

(21) Appl. No.: 11/165,089

(22) Filed: Jun. 23, 2005

(65) Prior Publication Data

US 2006/0046881 A1 Mar. 2, 2006

(30) Foreign Application Priority Data

Aug. 27, 2004 (JP) ............................. 2004-249311
Aug. 27, 2004 (JP) ............................. 2004-249312

(51) Int. Cl.
*F16H 61/00* (2006.01)

(52) U.S. Cl. .......................................... 474/81; 474/69

(58) Field of Classification Search ................... 474/69, 474/81, 80
See application file for complete search history.

(56) References Cited

U.S. PATENT DOCUMENTS

| 4,058,020 | A |   | 11/1977 | Huret et al. |         |
|-----------|---|---|---------|--------------|---------|
| 4,384,864 | A |   | 5/1983  | Bonnard      |         |
| 5,213,549 | A | * | 5/1993  | Blanchard    | 474/81  |
| 5,873,590 | A | * | 2/1999  | Abe et al.   | 280/259 |
| 6,419,602 | B1| * | 7/2002  | Soon         | 474/80  |
| 2004/0014543 | A1 |   | 1/2004 | Van Der Linde |         |
| 2004/0130120 | A1 | * | 7/2004 | Matsumoto et al. | 280/260 |
| 2006/0046881 | A1 | * | 3/2006 | Matsumoto et al. | 474/81  |

FOREIGN PATENT DOCUMENTS

| DE | 4129198   | 3/1993 |
| EP | 1418120   | 5/2004 |
| EP | 1564126   | 8/2005 |
| EP | 1564128   | 8/2005 |
| JP | 62-8180   | 1/1987 |
| JP | 2004-155280 | 6/2004 |

* cited by examiner

*Primary Examiner*—John Q Nguyen
*Assistant Examiner*—Robert T Reese
(74) *Attorney, Agent, or Firm*—Carrier, Blackman & Associates P.C.; William D. Blackman; Joseph P. Carrier

(57) ABSTRACT

A gear-shifting apparatus is provided which easily returns a derailed chain to engagement with a tension and/or guide pulley when the chain comes off the respective pulley due to a gear-shifting operation, and enables a gear-shifting operation to be performed when a gear-shifting is halted or is rotating backward. A derailer includes an arm which supports a tension pulley and a pulley support member which supports a guide pulley. The arm is provided with engagement recovery-guiding parts for causing respectively derailed parts of a chain, which are derailed from the orbital plane of the tension pulley, to engage with the tension pulley. The pulley support member is provided with a first extending part and a second extending part for the purpose of causing derailed parts of a chain, which has been derailed from the orbital plane of the guide pulley, to engage with the guide pulley.

19 Claims, 11 Drawing Sheets

GEAR-SHIFTING APPARATUS FOR A BICYCLE, AND BICYCLE INCORPORATING SAME

CROSS-REFERENCE TO RELATED APPLICATIONS

The present invention claims priority under 35 USC 119 based on Japanese patent application No. 2004-249311, filed on Aug. 27, 2004, and Japanese Patent Application No. 2004-249312, filed on Aug. 27, 2004. The subject matter of each of these priority documents is incorporated by reference herein.

BACKGROUND OF THE INVENTION

1. Field of the Invention

The present invention relates to a gear-shifting apparatus for a bicycle, and to a bicycle incorporating the apparatus. More particularly, the invention relates to a gear-shifting apparatus of a type using a chain, which shifts the chain from one sprocket to another.

2. Background

One example of a known gear-shifting apparatus for a bicycle is disclosed in Japanese Patent Laid-open Official Gazette No. 2004-155280, and this known system includes: a drive sprocket connected to a crankshaft through a one-directional clutch, while the drive sprocket is being driven. The known gear-shifting apparatus of this reference also includes a sprocket cluster constituted of a plurality of gear-shifting sprockets, which is connected to an output axle for driving a rear wheel, a chain hooked to the drive sprocket and one of the gear-shifting sprockets, and a gear-shifting mechanism. The gear-shifting mechanism includes a derailer arm for rotatably supporting a guide pulley for guiding the chain to a selected gear-shifting sprocket and an arm for rotatably supporting a tension pulley for applying a tension force to the chain. When the guide pulley and the tension pulley move in the center axis direction of a derailer axle, the chain is shifted from a current gear-shifting sprocket to the selected gear-shifting sprocket. In this way, a gear-shifting operation is done.

It would be advantageous if gear-shifting operations could be done no matter what condition the bicycle travels in. For example, it is desirable to perform a gear-shifting operation quickly through a forward rotation of the crankshaft even while a bicycle moves backward in a condition where the rider is off the bicycle, or even while the bicycle is stopped. This feature would contribute to improving the performance in operating the bicycle. Particularly during bicycle racing, where racers compete in time trials, providing a racer with more opportunities for operating the gear shift will lead to better race results.

However, when the gear-shifting sprockets are not rotating forward, including a case where the gear-shifting sprockets are rotating backwards while the bicycle is moving backwards and a case where the gear-shifting sprockets are halted while the bicycle is in a stop, if a gear-shifting operation were performed so that the guide pulley moves towards the center axis direction (hereinafter referred to as the "axis direction"), a part of the chain which is hooked to the guide pulley moves in the axis direction along with the guide pulley. By contrast, a part of the chain which is hooked to one of the gear-shifting sprockets does not move in the axis direction. For this reason, the part of the chain which is hooked to the guide pulley may come off, or become derailed from, the guide pulley in some cases. If the crankshaft were caused to rotate forward while the chain is in such a condition so that the drive sprocket and the gear-shifting sprockets rotate forward, the derailed part of the chain may get stuck between the guide pulley and the derailer arm in some cases. In other cases, the derailed part of the chain may be positioned beside the guide pulley and inwards in the radial direction from the outermost peripheral end of the guide pulley. This makes it difficult for the derailed part of the chain to re-engage with the guide pulley.

In addition, while the gear-shifting sprockets are rotating backwards, if a speed at which the gear-shifting sprockets are rotating is high, or if an equivalent occurs, a part of the chain may stagnate between the guide pulley and one of the gear sifting sprockets. If a part of the chain stagnates in this manner, the chain comes off the guide pulley more easily.

Furthermore, when the derailed part is in the process of engaging with the guide pulley again, if an obstacle hinders the derailed part from moving in a pathway where the derailed part is going to move, for example if there was a step made of a protrusion jutting out from the pathway where the derailed part is going to move, the promptness with which the derailed part of the chain returns to an engaged state with the guide pulley is decreased. In addition, the reliability with which the derailed part is caused to engage with the guide pulley again is reduced.

Still furthermore, if a gear-shifting operation is performed during a halt of the gear-shifting sprockets while the bicycle is in a stop or in an equivalent condition, the chain may come off the tension pulley at a part of the tension pulley which leads in the chain because of the following mechanism. When the gear-shifting operation moves the guide pulley and the tension pulley in the center axis direction (hereinafter referred to as an "axis direction"), a part of the chain which is currently on the top of the tension pulley moves along with the tension pulley in the axis direction on a part of the tension pulley which leads in the chain. By contrast, a part of the chain which is currently on the top of the drive sprocket hardly moves in the axis direction. Moreover, the chain is halted. In this manner, the chain comes off from the tension pulley. If a crankshaft were caused to make a forward rotation, and if accordingly the drive sprocket and the gear-shifting sprockets made a forward rotation while they are in such a condition, this derailed part of the chain which has come off from the tension pulley gets stuck between the tension pulley and the arm in some cases. In other cases, the derailed part gets stuck between the side of the tension pulley and a part inwards in the axis direction from the outermost side end of the tension pulley. In these cases, it is difficult for the derailed part to re-engage with the tension pulley.

With the aforementioned matters taken into consideration, the present invention has been made.

An object of the present invention is to provide a gear-shifting apparatus which makes it easier for the derailed part of the chain to return to an engaged state with the guide pulley even when the chain comes off from the orbital plane of the guide pulley due to a gear-shifting operation, and which enables a gear-shifting operation to be performed even when the gear-shifting sprockets are not rotating forward, including a case where the gear-shifting sprockets are rotating backwards.

A further object of the present invention is to inhibit the number of parts in the gear-shifting apparatus from increasing due to providing engagement recovery means to the gear-shifting apparatus, and is to reduce costs for the gear-shifting apparatus.

A further object of the present invention is to miniaturizing the gear-shifting apparatus in the axis direction.

A further object of the present invention is to miniaturize the engagement recovery means in the axis direction, accordingly to miniaturize the gear-shifting apparatus, and to increase rigidity of the arm, which supports the tension pulley, by use of the engagement recovery means.

A further object of the present invention is to improve promptness and reliability in which the derailed part of the chain returns to an engaged state with the guide pulley.

A further object of the present invention is to intend to miniaturize the gear-shifting apparatus in the axis direction, and concurrently to enable a smooth gear-shifting to be performed.

A further object of the present invention is to provide a gear-shifting apparatus which makes it easy to cause a derailed chain to return to a condition of engaging with the tension pulley when a gear-shifting operation has got the chain off the tension pulley, and which accordingly enables a new gear-shifting to be operated while the gear-shifting sprockets are in a halt and while the gear-shifting sprockets do not make a forward rotation.

A further object of the present invention is to increase the rigidity of the arm, and concurrently to cause the derailed part of the chain to return to a condition of engaging with the tension pulley more securely.

A further object of the present invention is to cause the derailed part to return to a condition of engaging with the tension pulley more securely, and concurrently to make the derailer arm lighter in weight.

A still further object of the present invention is to enable a gear-shifting to be operated easily.

A first aspect of the present invention relates to a gear-shifting apparatus including a plurality of gear-shifting sprockets arranged in the axis direction, and a changing mechanism for changing the chain from one sprocket to another among the plurality of gear-shifting sprockets in response to a gear-shifting operation. The changing mechanism includes a pulley support member, which rotatably supports the guide pulley to which the chain is hooked, and which moves in the axis direction by means of a gear-shifting operation. With regard to the gear-shifting apparatus, the guide pulley guides the chain hooked to one sprocket which has been selected out of the plurality of gear-shifting sprockets. In the gear-shifting apparatus, the pulley support member is provided with the engagement recovery means for causing the derailed part of the chain, which has been derailed from the orbital plane of the guide pulley, to engage with the guide pulley. The engagement recovery means includes a first extending part and a second extending part. The first extending part and the second extending part are arranged leftwards and rightwards in the axis direction from the orbital plane, and extend in the axis direction and in a direction away from the orbital plane. Each of the extending parts guides the derailed part, which has gone onto the extending part, in a way that the derailed part slides on the extending part and moves towards the orbital plane due to a tension force on the chain, and thereafter engages with the guide pulley.

In the case of the gear-shifting apparatus according to the first aspect of the present invention, the first extending part and the second extending part, which constitute the engagement recovery means, guide the derailed parts of the chain respectively in a way that the derailed parts of the chain slide respectively on the first extending part and the second extending part as well as engage with the guide pulley. This occurs no matter which side in the axis direction the guide pulley moves to, even when the chain comes off from the orbital plane due to movement of the guide pulley in the axis direction through a gear-shifting operation while the gear-shifting sprockets are rotating backwards or are in a halt. For this reason, while the gear-shifting sprockets are rotating forwards, the derailed parts are prevented from getting stuck between the guide pulley and the pulley support member, or from doing an equivalent thing. This enables the chain to run. Accordingly, the chain will not get stuck between one of the gear-shifting sprockets and the guide pulley (in other words, the chain will not stagnate), even if a gear-shifting operation is performed, for example, while the gear-shifting sprockets are rotating backwards. Accordingly, the chain securely returns to an engaged state with the guide pulley when the gear-shifting sprockets rotate forward.

A gear-shifting apparatus according to a second aspect of the present invention includes the following configuration in addition to including the same configuration as the gear-shifting apparatus according to the first aspect of the present invention. The pulley support member includes a holder for rotatably supporting the guide pulley, and an arm for rotatably supporting a tension pulley which is supported by the holder, and which applies a tension force to the chain. The first extending part is molded integrally with the arm. The second extending part includes a spring containing part which contains a tension spring to generate a spring force with which to push the tension pulley against the chain.

In the case of the gear-shifting apparatus according to the second aspect of the present invention, the first extending part and the second extending part are provided by use of the spring containing part which contains the arm and the tension spring which are a member to support the tension pulley. This does not require preparation of a specialized member for constituting the first extending part and the second extending part.

A gear-shifting apparatus according to a third aspect of the present invention includes the following configuration in addition to including the same configuration as the gear-shifting apparatus according to the first or second aspects of the present invention. The plurality of gear-shifting sprockets are arranged sequentially in a way that a gear-shifting sprocket with a larger outer diameter comes next to a gear-shifting sprocket with a smaller outer diameter to a side in the axis direction. The first extending part and the second extending part are arranged respectively in the side from the orbital plane and in the opposite side in the axis direction. A guide surface onto which the derailed part can go in the first extending part is located in a position whose distance from the centerline of rotation of the guide pulley is smaller in comparison with a guide surface onto which the derailed part can go in the second extending part.

In the case of the gear-shifting apparatus according to the third aspect of the present invention, while the guide pulley moves towards the side, interference between the first extending part and each of the gear-shifting sprockets is eliminated. In addition, a guide pulley and each of the gear-shifting sprockets are arranged so as to be closer to each other.

A gear-shifting apparatus according to a fourth aspect of the present invention includes the following configuration in addition to including the same configuration as the gear-shifting apparatus according to the second or third aspects of the present invention. The first extending part is provided so as to extend into a position which makes the first extending part seem to overlap with the tension pulley when viewed from the side. A width in the axis direction of the first extending part is almost equal to a width in the axis direction of the chain.

In the case of the gear-shifting apparatus according to the fourth aspect of the present invention, the first extending part functions as a reinforcement rib of the arm. For this reason, rigidity of the arm which supports the tension pulley is increased. In addition, a guiding function of causing the derailed part to return to an engaged state with the guide pulley is secured. Furthermore, the width in the axis direction of the first extending part is made smaller.

A gear-shifting apparatus according to a fifth aspect of the present invention includes the following configuration in addition to including the same configuration as the gear-shifting apparatus according to the second aspect of the present invention. The arm includes a first arm part and a second arm part. The first arm part is arranged in the axis direction by the sides respectively of the orbital planes of the guide pulley and the tension pulley. The second arm part is arranged in the axis direction by the other sides respectively of the orbital planes of the guide pulley and the tension pulley. The first arm part is provided with the first extending part. The second arm part is provided with the spring containing part so that the spring containing part is next to the second arm part in the axis direction. The second arm part is arranged in the axis direction between the guide pulley and the spring containing part. The outermost edge of the second arm part in the radial direction is located in a position whose distance from a centerline of rotation of the guide pulley is equal or smaller in comparison with the guide surface in the spring containing part onto which the derailed part can go.

In the case of the gear-shifting apparatus according to the fifth aspect of the present invention, the derailed part is guided by the second extending part so that, without being interfered by the second arm part, the derailed part moves on the guide surface smoothly and is able to return to an engaged state with the guide pulley.

A gear-shifting apparatus according to a sixth aspect of the present invention includes the following configuration in addition to including the same configuration as the gear-shifting apparatus according to the fifth aspect of the present invention. The width in the axis direction of the first extending part is almost equal to the width occupied by two of the gear-shifting sprockets which are next to each other in the axis direction. The width in the axis direction of the second extending part is larger than the width in the axis direction of the first extending part.

In the case of the gear-shifting apparatus according to the sixth aspect of the present invention, the guiding function of causing the derailed part to return to an engaged state with the guide pulley is secured by use of the first extending part and the second extending part. In addition, the width in the axis direction of the first extending part is made smaller. Furthermore, even if a width in which the derailed part moves in the axis direction is larger, the second extending part causes the derailed part to securely go onto the second extending part, and accordingly causes the derailed part to return to an engaged state with the guide pulley.

A gear-shifting apparatus according to a seventh aspect of the present invention relates to a gear-shifting apparatus configured as follows. The gear-shifting apparatus includes a plurality of gear-shifting sprockets arranged in the axis direction, and a changing mechanism for changing the chain from one sprocket to another in the plurality of gear-shifting sprockets. The changing mechanism includes an arm for rotatably supporting a tension pulley for applying a tension force to the chain. In the gear-shifting apparatus, a gear-shifting operation moves the arm in the axis direction. With regard to the arm, its part near a part of the tension pulley, which leads in the chain, is provided with an engagement recovery-guiding part for causing a derailed part of the chain, which has got off an orbital plane of the tension pulley, to engage with the tension pulley. The engagement recovery-guiding part positions the entire derailed part outwards the rotation track of the outermost side end of the tension pulley in the radius direction, and concurrently guides the derailed part in order to cause the derailed part to engage with the tension pulley after the derailed part moves towards the orbital plane by means of the tension force on the chain.

This gear-shifting apparatus causes the engagement recovery-guiding part to guide the derailed part of the chain so that the derailed part of the chain returns to a condition of engaging with the tension pulley, even if a gear-shifting operation moves the tension pulley in the axis direction and thereby the chain comes off from the orbital plane of the chain when the gear-shifting sprocket is halted or in an equivalent case. This prevents the derailed part from getting stuck between the tension pulley and the arm. This enables the chain to run.

A gear-shifting apparatus according to an eighth aspect of the present invention further includes the following configuration in addition to including the same configuration as the gear-shifting apparatus according to the seventh aspect of the present invention. The changing mechanism includes a guide pulley for guiding the chain to be hooked to a working sprocket which has been selected out of the plurality of gear-shifting sprockets, and a holder which rotatably supports the guide pulley, and which can move in the axis direction along with the arm. The arm includes a pair of arm parts, one of which is arranged in one side of the tension pulley and the guide pulley in their axis directions, and the other of which is arranged in the other side of the tension pulley and the guide pulley in their axis directions. A tension-pulley-side guiding part for preventing a part of the chain which is hooked to the tension pulley from getting off the pulley and a supported part which is supported by the holder are formed in each of the arm parts. An interval in the axis direction between the two supported parts is wider than an interval in the axis direction between the tension-pulley-side guiding parts.

This gear-shifting apparatus can increase the bending rigidity of each of the supported parts, which is a part onto which a force moving the arm in the axis direction functions from the changing mechanism. In addition, since the interval in the axis direction between the tension-pulley-side guiding parts in the arm is formed so as to be narrower, the tension-pulley-side guiding parts can be arranged closer to the tension pulley. This can cause the derailed part, which is guided by the engagement recovery-guiding part, to return to a condition of securely engaging with the tension pulley.

A gear-shifting apparatus according to a ninth aspect of the present invention further includes the following configuration in addition to including the same configuration as the gear-shifting apparatus according to the eighth aspect of the present invention. While a center plane is defined as including a line representing the center of rotation of the tension pulley and a line representing the center of the rotation of the guide pulley, a range where the engagement recovery-guiding part is formed in the circumferential direction is a range which makes an angle to the center plane in a direction of a forward rotation of the tension pulley from the centerline of rotation of the tension pulley equal to an angle to the center plane in a direction of a reverse rotation of the tension pulley from the centerline of rotation of the tension pulley, when viewed from the side.

This gear-shifting apparatus makes it possible to sufficiently secure the range, where the engagement recovery-guiding part is formed in the circumferential direction, along the center plane. This enables the derailed part to easily return to a condition of engaging with the tension pulley. In addition, a point in the engagement recovery-guiding part at which the derailed part applies a force when the derailed part comes into contact with the engagement recovery-guiding part can be designed to come close to the center plane. Accordingly, this force can reduce a torque which is applied to each of the arm parts. This does not require each of the arm parts to be made larger, or accordingly to be heavier in weight, for the purpose of increasing torsional rigidity of each of the arm parts.

A gear-shifting apparatus according to a tenth aspect of the present invention further includes the following configuration in addition to including the same configuration as the gear-shifting apparatus according to the seventh aspect of the present invention. The arm includes a pair of arm parts which are arranged respectively on the two sides of the tension pulley, and in which the engagement recovery-guiding parts are respectively formed. Each of the engagement recovery-guiding parts has a guide plane with which the derailed part comes into contact, and which extends in the axis direction and in a direction orthogonal to the orbital plane. A position of an end portion of the guide plane which is closest to the tension pulley in the axis direction virtually agrees with, or is aligned with, a position of the inner circumferential edge of the chain engaging with the tension pulley.

This gear-shifting apparatus causes the derailed part to run onto the guide plane easily. This causes the derailment to begin at a position of the engagement recovery-guiding part, the position being in a direction a forward rotation of the tension pulley. This relieves torsion of the chain caused due to a movement in the axis direction of the tension pulley. The relief reduces a resistance force from the chain while a gear-shifting operation is being performed.

According to a first aspect of the present invention, even when part of the chain comes off the orbital plane of the guide pulley due to a gear-shifting operation which is performed while the gear-shifting sprockets are rotating backwards, in a stop or in an equivalent condition, the first extending part and the second extending part guide the derailed part so that the derailed part engages with the guide pulley again, thus enabling the chain to run. This makes it easier to cause the derailed part to return to an engaged state with the guide pulley. Accordingly, a gear-shifting operation can be performed even when the gear-shifting sprockets are not rotating forward, including a case where the gear-shifting sprockets are rotating backwards. A gear-shifting can be carried out on the base of the gear-shifting operation thus made possible.

According to the second aspect of the invention, in addition to the above-recited effect of the first aspect of the present invention, a specialized member for providing the first extending part and the second extending part is not required. Accordingly, the number of the parts of the gear-shifting apparatus provided with the engagement recovery means is reduced, and the costs for the gear-shifting apparatus is also reduced.

According to the third aspect of the invention, in addition to the above-recited effect of any of the first or second aspects of the present invention, interference between the extending part and each of the gear-shifting sprockets in conjunction with movement of the guide pulley is eliminated. Accordingly, reliability in which a gear-shifting operation is performed is secured. In addition, the guide pulley and each of the gear-shifting sprockets are arranged so as to be closer to each other. This enables the gear-shifting apparatus to be miniaturized. Furthermore, reliability in which a gear-shifting operation is performed is improved. Additionally, this enables a gear-shifting to be carried out smoothly.

According to the fourth aspect of the invention, in addition to the above-recited effect of any of the second or third aspects of the present invention, rigidity of the arm can be increased by use of the first extending part. In addition, the first extending part is miniaturized in the axis direction. Moreover, a gear-shifting sprocket cluster and the guide pulley are arranged so as to be closer to each other in the axis direction. For this reason, the gear-shifting apparatus is miniaturized in the axis direction.

According to the fifth aspect of the present invention, in addition to the above-recited effect of the second aspect of the present invention, the derailed part is guided smoothly by the second extending part so that the derailed part returns to an engaged state with the guide pulley. Accordingly, promptness and reliability with which the derailed part returns to an engaged state with the guide pulley is improved. In addition, reliability with which a gear-shifting is carried out is improved.

According to the sixth aspect of the present invention, in addition to the above-recited effect of the fifth aspect of the present invention, the extending part is miniaturized in the axis direction. The sprocket cluster and the guide pulley are arranged so as to be closer to each other in the axis direction. Accordingly, the gear-shifting apparatus is miniaturized in the axis direction. Furthermore, the gear-shifting apparatus is miniaturized in the axis direction. In addition, reliability with which the derailed part returns to a state of the engagement is improved by the second extending part. Additionally, reliability with which a gear-shifting is carried out is improved.

According to the seventh aspect of the invention, even when part of the chain comes off the orbital plane of the tension pulley due to a gear-shifting operation which is performed while the gear-shifting sprockets are in a stop or in an equivalent condition, the engagement recovery-guiding part guides the derailed part so that the derailed part engages with the tension pulley again, thus enabling the chain to run. This makes it easy to cause the derailed part to return to a condition of engaging with the tension pulley. Accordingly, a gear-shifting operation can be performed while the gear-shifting sprockets are halted and while the gear-shifting sprockets do not make a forward rotation. A gear-shifting can be carried out on the base of the gear-shifting operation thus made possible.

According to the eighth aspect of the invention, in addition to the above-recited effect of the seventh aspect of the present invention, rigidity of the supported part on which a force functions from the changing mechanism for moving the arm in the axis direction is increased. This enables the supported part to be made lighter in weight. In addition, the derailed part is caused to return to a condition of securely engaging with the tension pulley, thus improving a degree of certainty with which the derailed part returns to the condition of engaging with the tension pulley.

According to the ninth aspect of the present invention, in addition to the above-recited effect of the eighth aspect of the present invention, the range where the engagement recovery-guiding part is formed in the circumferential direction can be secured sufficiently. This improves a degree of certainty with which the derailed part returns to the condition of engaging with the tension pulley. A force which the derailed part causes to function on the engagement recovery-guiding part can reduce a torque which is applied to each of the arm parts. This enables each of the arm parts to be made lighter in weight.

According to the tenth aspect of the invention, in addition to the above-recited effect of the ninth aspect of the present invention, torsion of the chain caused due to a movement in the axis direction of the tension pulley is relieved. This enables a gear-shifting operation to be performed more easily.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 4 is a cross-sectional view taken along the IVa line in FIG. 2. In addition, solid lines show the arm which is located in the fastest gear-shifting position. Long dashed double-short dashed lines show the arm which is located in the slowest gear-shifting position.

DETAILED DESCRIPTION OF THE INVENTION

Hereinbelow, descriptions will be provided for selected illustrative embodiments of the present invention, with reference to FIGS. 1 to 12.

Figure 1:
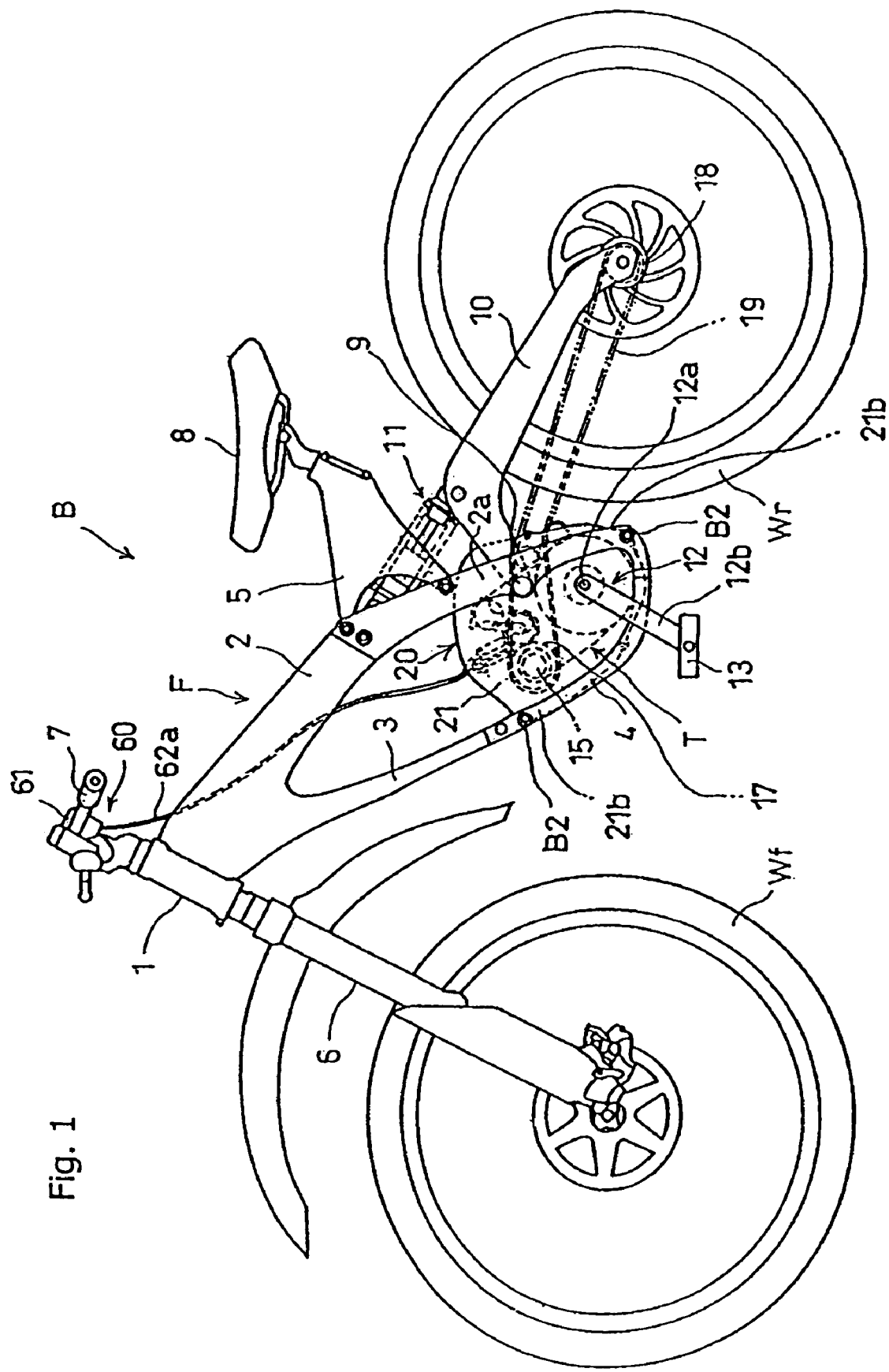
FIG. 1 is a left side plan view of a bicycle including an embodiment of the inventive gear-shifting apparatus.

As shown in FIG. 1, a bicycle B is provided with a gear-shifting apparatus T, according to a selected illustrative embodiment of the present invention. The bicycle B includes: a bicycle frame F; a crankshaft 12 operatively mounted to the frame and having a pair of crank arms 12b extending therefrom, with pedals 13 attached to the distal ends of the crank arms. The gear-shifting apparatus T includes an output axle 15 which is driven to rotate by power transmitted thereto after a gear-shifting is performed; and a transmission system, including a drive-power transmitting mechanism.

The bicycle frame F includes a head pipe 1 which rotatably supports the shaft of a front wheel Wf in the lower end thereof, and which supports a front fork 6 mounted with a handlebar 7 at the top of the front fork 6 in a manner such that the front fork 6 can be steered. The bicycle frame F includes a pair of mainframes 2 which are arranged side by side, and which extend obliquely from the head pipe 1 downwards to the rear, down-tubes 3 which obliquely extend from the front ends of the respective two mainframes 2 downwards to the rear, and a pair of under-tubes 4 which are arranged side-by-side, and which connect rear ends respectively of the two main frames 2 to rear ends respectively of the down-tubes 3. The bicycle frame F also includes a saddle frame 5 which extends from each of the main frames 2, and which supports a saddle 8. The two main frames 2 and the two down-tubes 3 are members are initially formed separately from each other, and are later joined together by welding.

It should be noted that positional descriptions of the upper, the lower, the front, the rear, the left and the right in the present specification and claims, respectively, match the upper, the lower, the front, the rear, the left and the right of the bicycle B, considered from the perspective of an operator seated on the saddle 8 and facing forward. In addition, an "axis direction" means a direction in which the axial centerline L3 of rotation of each of gear-shifting sprockets 41-47 extends, and "viewed from the side" means to be viewed in the axis direction.

A pair of swing arms 10 are arranged side by side and are operatively connected to the frame F. The swing arms 10 rotatably support a shaft of the rear wheel Wr at the rear end portions thereof opposite the frame F, as shown. The respective front ends of the swing arms 10 are swingably supported on a pivot axle 9 (see also FIG. 3) provided commonly to rear parts 2a respectively of the two main frames 2 through an axle attached to the respective rear end portions of the pair of swing arms 10. The two swing arms 10 are joined, respectively, to the two main frames 2 through a rear suspension 11. Thereby, the two swing arms 10, along with the attached rear wheel Wr, can swing up and down about the pivot axle 9.

The gear-shifting apparatus T as well as a main shaft 12a of the crankshaft 12 and an output axle 15, both of which are rotatably supported by a case 20 of the gear-shifting apparatus T, are arranged in a space which is located in a lower portion of the bicycle frame F, and which is formed among the rear parts 2a respectively of the two main frames 2 and the two under-tubes 4. In addition, the drive-power transmitting mechanism is arranged on the right side of the bicycle frame F.

Figure 2:
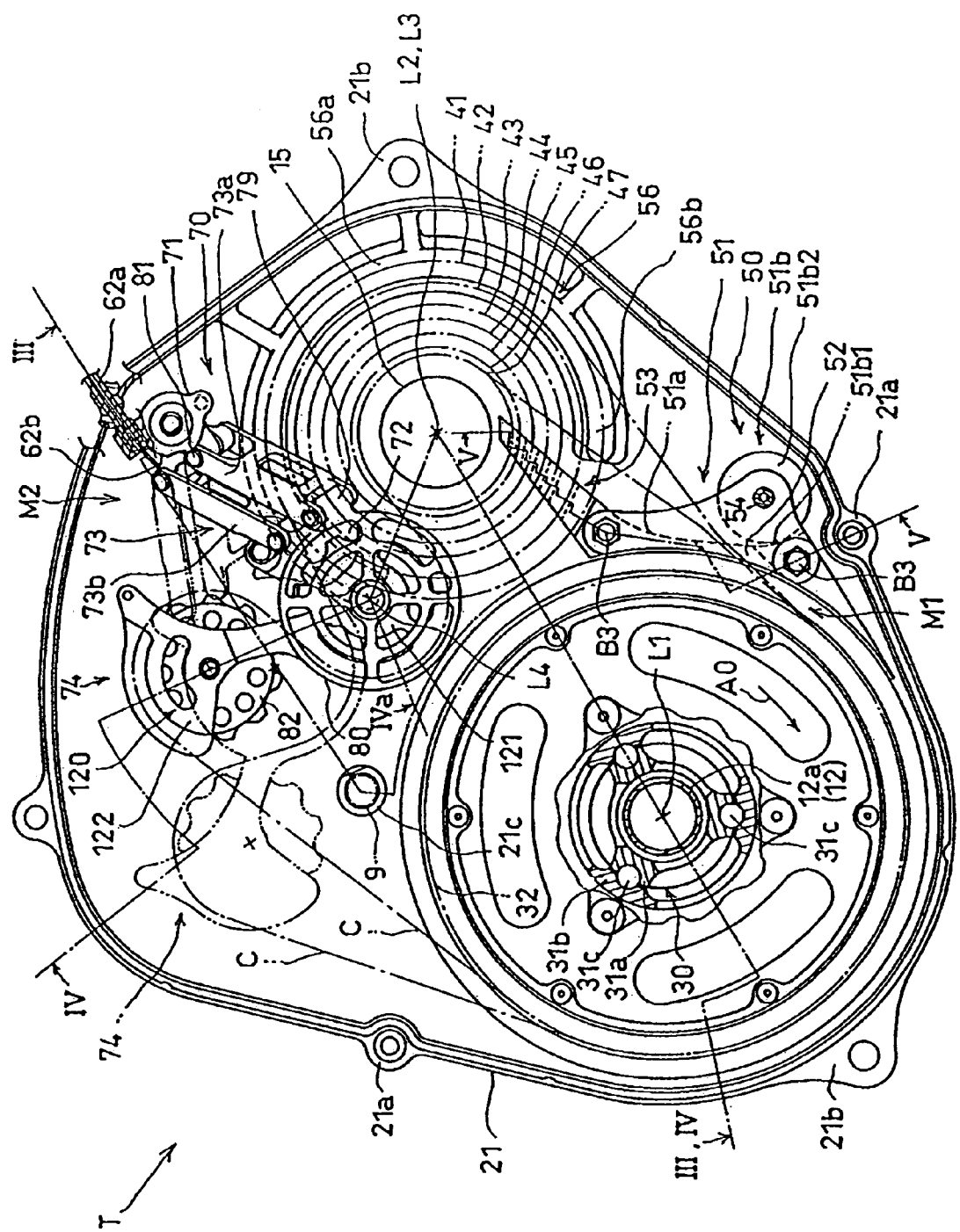
FIG. 2 is an enlarged diagrammatic view of the gear case of the gear-shifting apparatus of FIG. 1 as viewed in the direction of the arrow II in FIG. 4, and a cross section of parts of FIG. 4, which is taken while a second case part of the gear-shifting apparatus of FIG. 1 is removed. In addition, solid lines show an arm which is located in the fastest gear-shifting position. Long dashed double-short dashed lines show an arm which is located in the slowest gear-shifting position.

As shown in FIG. 2 in addition to FIG. 1, the gear-shifting apparatus T includes a metallic housing or case 20 constituted of a first case part 21 and a second case part 22, which are arranged side by side, and which are joined together with a bolt B1 (see FIG. 5) in two bosses 21a and 22a formed in adjacent peripheral portions thereof. In addition, the case 20 is fixed to each of the two main frames 2 and each of the two under-tubes 4 with bolts B2 (FIG. 1) which are received in a pair of attachment parts (FIG. 2 shows the attachment parts 21b of the first case part 21) formed in the peripheral portions of the case parts 21 and 22, respectively. The first and second case parts 21 and 22, respectively formed of plate materials, are molded through any one of milling out, casting, or pressing.

Figure 3:
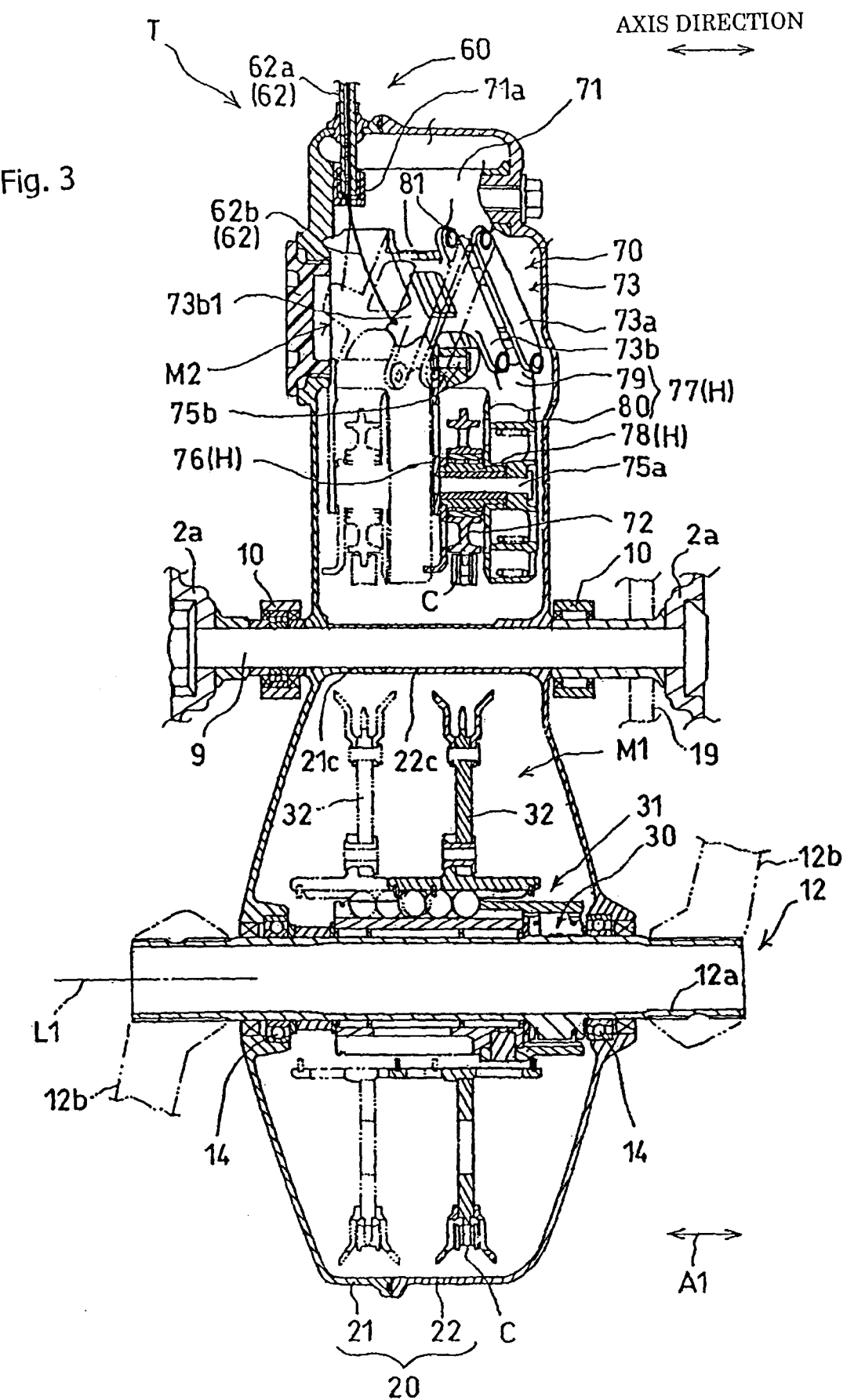
FIG. 3 is a cross-sectional view of the gear case of the gear-shifting apparatus of FIG. 1 taken along the III-III line in FIG. 2 showing a cross-section of parts of a derailer. In addition, solid lines show the arm which is located in the fastest gear-shifting position. Long dashed double-short dashed lines show the arm which is located in the slowest gear-shifting position.

As shown in FIG. 3 in addition to FIG. 2, the crankshaft 12 is provided as a main shaft 12a which is arranged to penetrate through a lower portion of the case 20 in the left-right direction. As noted above, a pair of crank arms 12b are joined, respectively, to the left and right ends of the main shaft 12a protruding from the case 20. The crankshaft 12 is rotatably supported in the first case part 21 and the second case part 22, respectively, with a pair of bearings 14. In addition, a pedal 13 (see FIG. 13) is rotatably mounted onto the distal end of each of the respective crank arms 12b.

The output axle 15 is arranged in a position forward, and obliquely upward, from the main shaft 12a in a way that a centerline L2 of rotation of the output axle 15 and a centerline of swing of each of the swing arms 10 are in parallel with each other, and in a way that the centerline L2 of rotation of the output axle 15 and the centerline of swing of each of the swing arms 10 are concurrently in parallel with the centerline L1 of rotation of the crankshaft 12. In addition, the centerline L2 of rotation of the output axle 15 and the centerline of swing of each of the swing arms 10 are within a rotation track of the crank arm 12b. The pivot axle 9 is arranged in a position virtually right above the main shaft 12a, such that a centerline L2 of rotation of the output axle 15 and a centerline of swing of each of the swing arms 10 are in parallel with each other, such that the centerline L2 of rotation of the output axle 15 and the centerline of swing of each of the swing arms 10 are concurrently in parallel with the centerline L1 of rotation of the crankshaft 12, and such that the centerline L2 of rotation of the output axle 15 and the centerline of swing of each of the swing arms 10 are within a rotation track of the crank arm 12b. The pivot axle 9, fixed to the main frames 2, is inserted so as to penetrate through-holes respectively of bosses 21c and 22c formed in the first and the second case parts 21 and 22, and supports the first and the second case parts 21 and 22.

Figure 4:
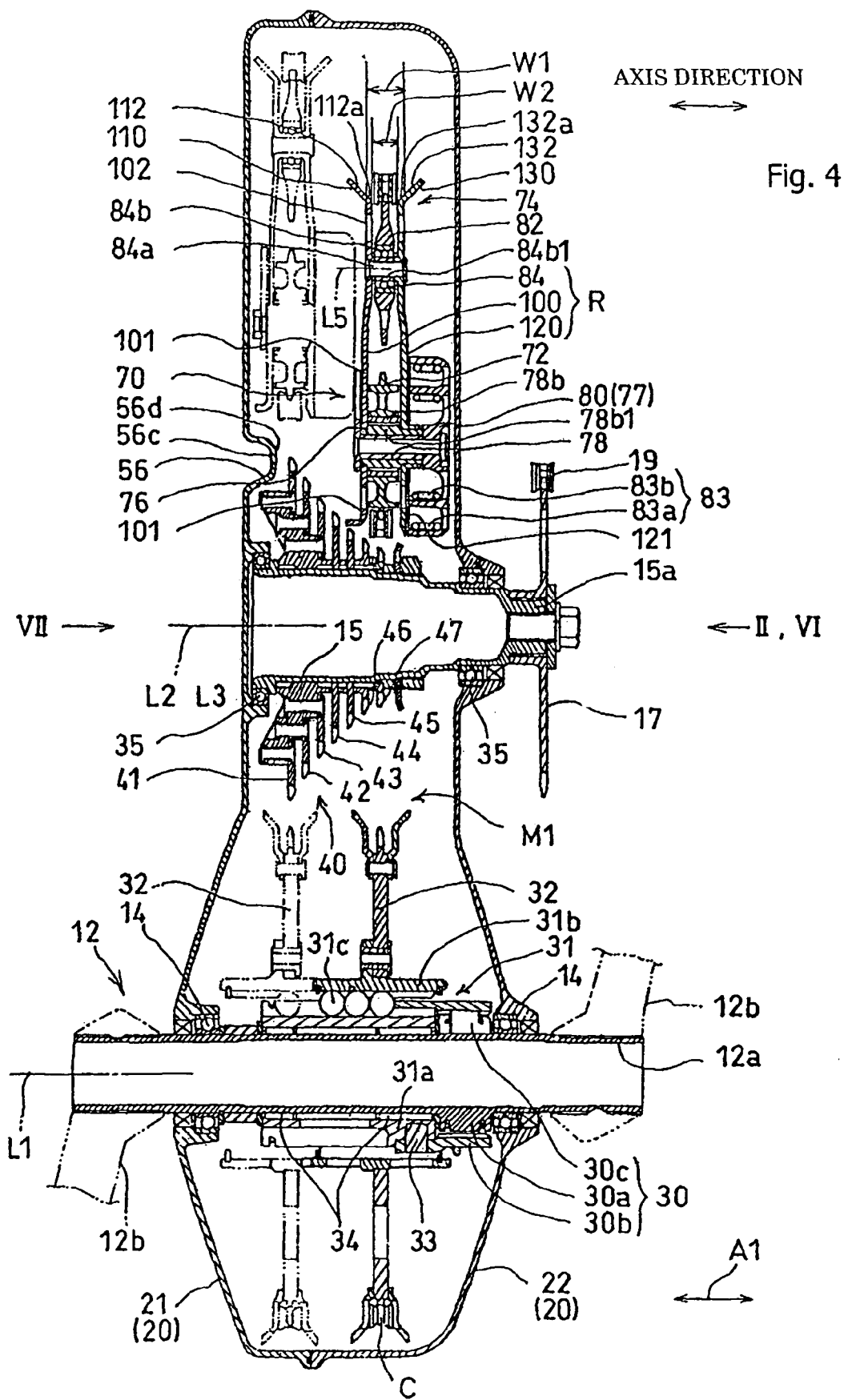
FIG. 4 is a cross-sectional view of the gear case of the gear-shifting apparatus of FIG. 1 taken along the IV-IV line in FIG. 2. With regard to the parts of the derailer.

As shown in FIG. 4, the output axle 15 contained in the case 20 includes an end part 15a protruding rightwards from the second case part 22. A drive output sprocket 17 for output, which is a drive body for rotational output, is joined to the end part 15a. As shown in FIG. 1 in addition to FIG. 4, a chain 19, which provides a flexible endless power transmission loop for output, is hooked to the drive output sprocket 17 and also to a driven sprocket 18 for output, which is a driven body of rotation for output. In addition, the drive output sprocket 17, the chain 19 and the driven sprocket 18 constitute the drive-power transmitting mechanism for driving the rear wheel Wr which is a drive wheel.

Further descriptions will be provided herein chiefly for the gear-shifting apparatus T, and the structure of the component parts thereof.

As shown in FIGS. 2 to 4, the gear-shifting apparatus T includes the case 20, a speed changing mechanism M1 using a chain, and a gear-shifting mechanism M2 for moving the speed changing mechanism M1 to a desired gear-shifting position, depending on a gear-shifting operation. A derailer 70, which will be described later, is a component of both the speed changing mechanism M1 and the gear-shifting mechanism M2, and is contained in the case 20.

The speed changing mechanism M1 includes: a unidirectional clutch 30; a ball spline 31 which is a sliding mechanism; a drive input sprocket 32; a plurality of gear-shifting sprockets 41 to 47 which are driven sprockets; an endless chain C for gear-shifting and for transmitting a drive force; and a chain-guiding member 50.

The main shaft 12a of the crankshaft 12 is an input axle through which a drive torque is inputted when the rider drives, and rotates, the crankshaft 12. The drive input sprocket 32 is a common sprocket. The drive input sprocket 32 is arranged around the main shaft 12a, and is coaxial therewith. The drive input sprocket 32 is connected to the main shaft 12a through the unidirectional clutch 30 when the drive input sprocket 32 is driven. The unidirectional clutch 30 includes three inner clutch members 30a, three outer clutch members 30b, and three clutch elements 30c. The three inner clutch members 30a are formed as parts of the main shaft 12a. Each of the three outer clutch members 30b has ratchet teeth which are formed in the inner periphery thereof. Each of the three clutch elements 30c is arranged between one of the inner clutch members 30a and corresponding one of the outer clutch members 30b, and includes a claw to engage with the corresponding ratchet teeth of the outer clutch members. The unidirectional clutch 30 transmits to the drive input sprocket 32 only rotations in a direction AO in which the crankshaft 12 makes forward rotations. Hereinafter, reference symbol AO denotes directions in which each of the various axles and the sprockets makes forward rotations when the crankshaft 12 rotates in the forward-rotational direction AO.

Three ball splines 31 are provided between the drive input sprocket 32 and each of the unidirectional clutches 30. Each of the ball splines 31 enables the drive input sprocket 32 to move in a direction A1 in which the centerline L1 of rotation extends (equal to the axis direction) relative to the main shaft 12a, and causes the drive input sprocket 32 to rotate along with the outer clutch member 30b of a corresponding one of the unidirectional clutches 30. Each of the ball splines 31 includes an inner cylinder 31a, an outer cylinder 31b and a plurality of balls 31c. The inner cylinder 31a is joined integrally with the outer clutch member 30b by use of a connecting pin 33, and is rotatably supported by the outer periphery of the main shaft 12a with a bearing 34 located between the inner cylinder 31a and the outer periphery. Outwards in a radial direction of the inner cylinder 31a, the outer cylinder 31b is arranged so as to be coaxial with inner cylinder 31a. Additionally, the outer cylinder 31b is joined integrally with the drive input sprocket 32. The plurality of balls 31c are rollably contained between a pair of containing grooves. The pair of containing grooves are arranged between the inner cylinder 31a and the outer cylinder 31b, and are formed respectively in the inner cylinder 31a and the outer cylinder 31b so as to extend in parallel with the centerline L1 of rotation. Although the above descriptions have mentioned the pair of containing grooves, a plurality of pairs of containing grooves may be provided. In the case of this embodiment, three pairs of containing grooves are provided. For this reason, the outer cylinder 31b and the drive input sprocket 32 rotate integrally with the inner cylinder 31a, with the balls 31c interposed between the outer cylinder 31b and the inner cylinder 31a. On the other hand, the outer cylinder 31b and the drive input sprocket 32 can move in the direction A1 relative to the main shaft 12a and the inner cylinder 31, which can not move in the direction A1.

The output axle 15 is rotatably supported by the case 20 with a pair of bearings 35 therebetween, the pair of bearings 35 being held respectively by the case parts 21 and 22. A sprocket cluster 40 includes a plurality of sprockets which are different from one another in outer diameter and in number of teeth. As used herein, the outer diameter is the diameter of a circle defined by tooth tips of a sprocket. In the case of this embodiment, the sprocket cluster 40 includes 7 gear-shifting sprockets 41 to 47. The sprocket cluster, thus constituted, is joined with the output axle 15 by use of splines in such a way that the sprocket cluster 40 rotates integrally with the output axle 15, and in such a way that the sprocket cluster 40 is coaxial with the output axle 15. For this reason, a centerline L3 of rotation commonly of the gear-shifting sprockets 41 to 47 matches a centerline L2 of rotation of the output axle 15 in parallel with the centerline L1 of rotation of the crankshaft 12. All of the gear-shifting sprockets 41 to 47 are arranged in their common axis direction, in order from the gear-shifting sprocket 41 for a first speed representing the lowest speed, sequentially to the gear-shifting sprocket 47 for a seventh speed representing the highest speed. In the case of this embodiment, the seven gear-shifting sprockets 41 to 47 are arranged in order leftwards, from a sprocket with the smallest diameter sequentially to a sprocket with the largest diameter.

The chain C is hooked to the drive input sprocket 32 and to a sprocket in operation (hereinafter, referred to simply as a "working sprocket"), which is one of the gear-shifting sprockets 41 to 47. Each of FIGS. 2 to 4 illustrates a state where one of the gear-shifting sprockets 41-47 is selected out of the sprocket cluster 40 by use of the gear-shifting mechanism M2. Accordingly, the output axle 15 is driven, and rotated, by the crankshaft 12, at a ratio which is determined by the drive input sprocket 32 and a working sprocket connected to the drive input sprocket 32 through the chain.

Figure 5:
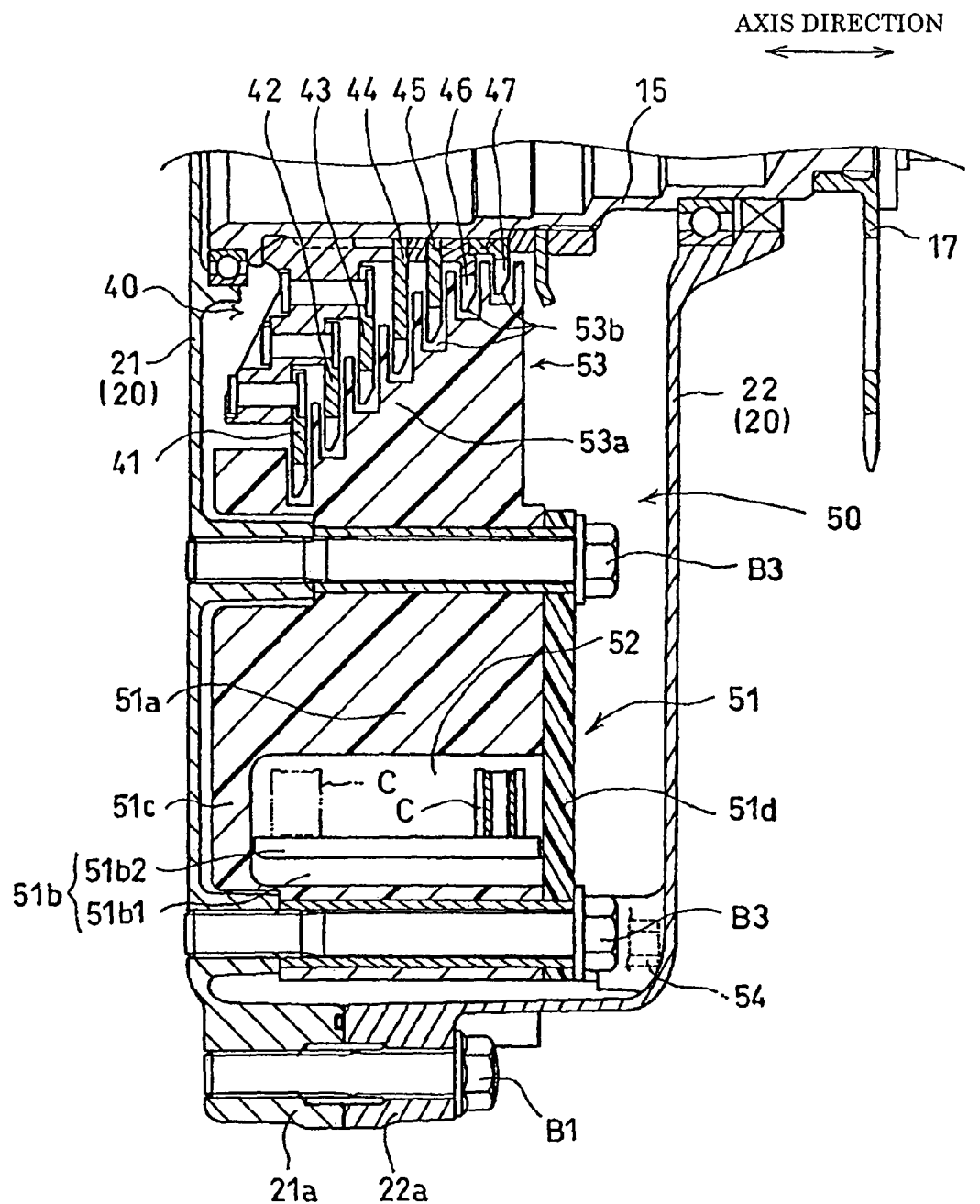
FIG. 5 is a cross-sectional view of the gear case of the gear-shifting apparatus of FIG. 1 taken along the V-V line in FIG. 2.

As shown in FIGS. 2 and 5, the chain-guiding member 50 is arranged between the drive input sprocket 32 and the sprocket cluster 40, and in a position in a direction which the chain C driven by the crankshaft 12 forwardly rotating is pulled. The chain-guiding member 50 constitutes a prevention means for preventing a slackened portion of the chain C from getting stuck between the drive input sprocket 32 and the case 20 when a decrease in the tension on the chain causes the slackened portion on the chain C in a position in the direction which the chain C is pulled.

The chain-guiding member 50 includes a guide part 51 and a check part 53. The guide part 51 forms an opening 52 with a width in its axis direction which is slightly larger than a width of the sprocket cluster 40 in its axis direction. A check part 53 prevents a portion of the chain C, which is caused to lead out from one of the gear-shifting sprockets 41 to 47, from moving towards the inside of the orbit of the chain. The guide part 51 guides the chain C which enters the opening 52 from one of the gear-shifting sprockets 41 to 47. The guide part 51 includes an inner guide part 51a, an outer guide part 51b, and side guide parts 51c and 51d. The inner guide part 51a is arranged in a position towards the inside of the orbit of the chain from the opening 52. The outer guide part 51b is arranged in a position toward the outside of the orbit of the chain from the opening 52. The side guide parts 51c and 51d are arranged respectively in positions outside the two sides in the axis direction of the opening 52. In addition, the outer guide part 51b includes a first part 51b1 and a roller 51b2. The first part 51b1 forms the opening 52 in cooperation with the inner guide part 51a, and the side guide parts 51c and 51d. The roller 51b2 is a second part, which is positioned toward the sprocket cluster 40 relative to the first part 51b1, and which guides the chain C to the opening 52. Furthermore, the check part 53 is arranged in a position which makes the check part 53 overlap with each of the gear-shifting sprockets 41 to 47 when the check part 53 is views from the side. The check part 53 extends from the inner guide part 51a toward each of the gear-shifting sprockets 41 to 47. Sets of teeth respectively of the gear-shifting sprockets 41 to 47 pass respectively of grooves 53b. The grooves 53b have their respective end parts 53a, and the number of the end parts 53a is equal to that of the gear-shifting sprockets 41 to 47.

The inner guide part 51a, the first part 51b, the check part 53 and the right side guide part 51c are constituted of a first member made of synthetic resin and which is a single member. The right side guide part 51d includes a second member made of synthetic resin. In addition, the first and the second members are joined to the first case part 21 with a pair of bolts B3. This fixes the chain guide member 50 to the case 20. On the other hand, the roller 51b2 is rotatably supported by a supporting axle 54. The left side of the supporting axle 54 is supported by the side guide part 51c and the first case part 21, and the right side of the supporting axle 54 is supported by the side guide part 51d and the second case part 22.

For example, when the bicycle B makes forceful upward and downward motions within a short time due to bumps of the road surface, a portion of the chain C in a direction which the chain C is pulled may jolt up and down, or a portion of the chain C may jolt inward and outward from the orbit of the chain. However, even if such jolts occur on the chain C, the chain guide member configured in the aforementioned manner causes the chain C to come in contact with the inner guide part 51a and the outer guide part 51b while the chain C is passing through the opening 52, thus checking the jolt magnitude of the chain. Accordingly, the chain is inhibited from jolt. This enables the bicycle B to run smoothly.

In addition, the chain C may run in a way that a decrease in the tension on the chain causes a slackened portion on the chain C in a position in the direction which the chain C is pulled. For example, the bicycle B may make an inertial forward motion while the crankshaft 12 is in a state of being in a halt or in a state of making a reverse rotation. In such a case, a torque is transmitted from the rear wheel Wr to the sprocket cluster 40 through the aforementioned drive-power transmitting mechanism and the aforementioned output axle 15. The torque drives the drive input sprocket 32 to rotate in the forward rotational direction A0 through the chain C. In this occasion, a decrease in the tension on the chain generates a slack portion of the chain in a position in the direction which the chain is pulled. Particularly, the bicycle B may continue traveling forward after the crankshaft 12, which has been forwardly rotated, comes to a sudden halt or while the crankshaft 12, which has been forwardly rotated, is caused to rotate in the reverse direction. In such a case, a portion of the chain C may become extremely slack so that the portion of the chain becomes entangled immediately before the drive input sprocket 32. The entangled portion of the chain may get stuck between the drive input sprocket 32 and the case 20.

However, even if a portion of the chain C becomes slack in a position in the direction which the chain is pulled, the chain-guiding member 50 decreases the slack in the chain C. This occurs because the chain-guiding member 50 causes the chain C to come into contact with the inner guide part 51a or the outer guide part 51b, thus checking an amount of the slack in the chain C.

Figure 6:
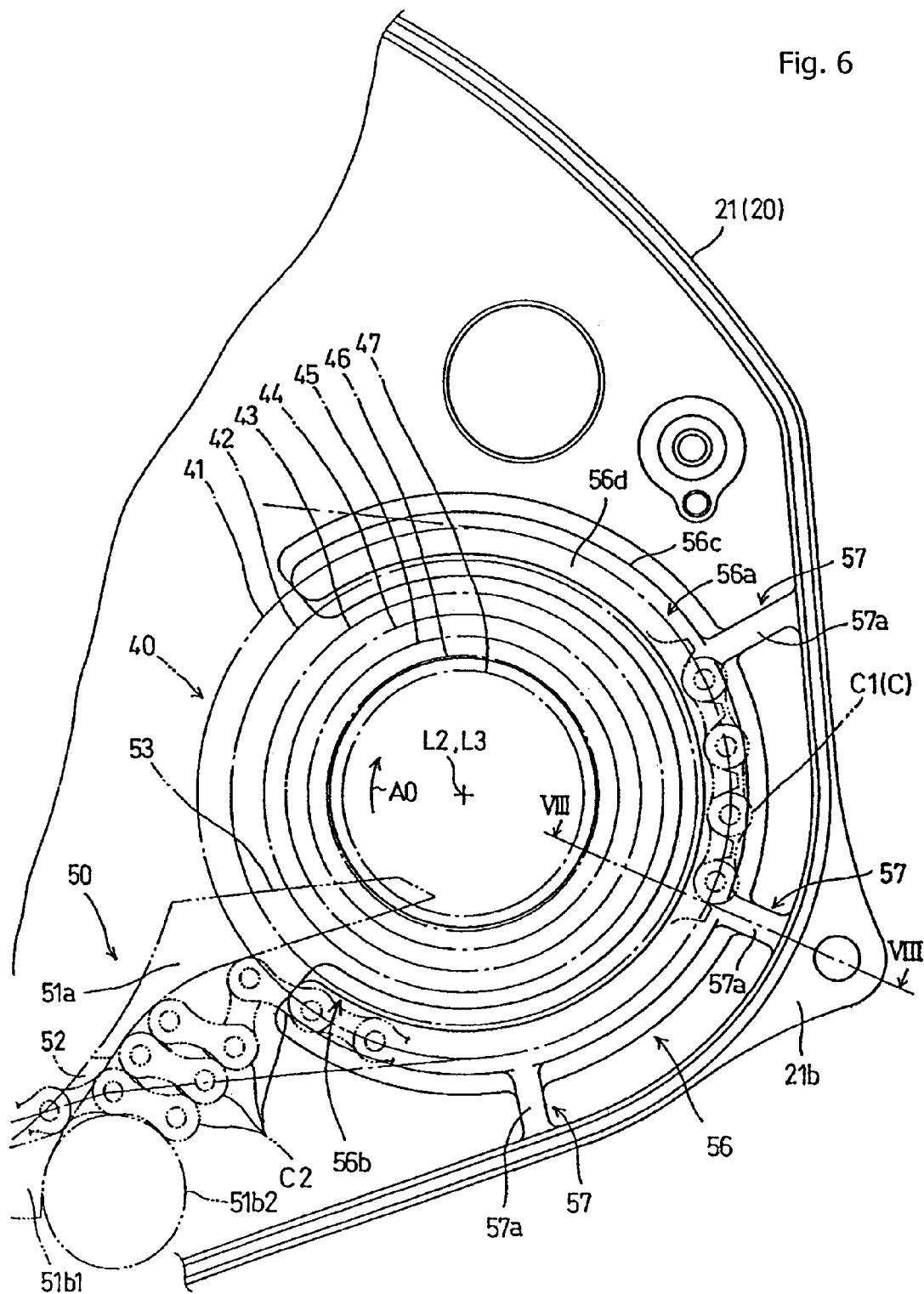
FIG. 6 is a side view of a main part of a case of the gear-shifting apparatus of FIG. 1, as viewed in the direction of the arrow VI in FIG. 4.
Figure 7:
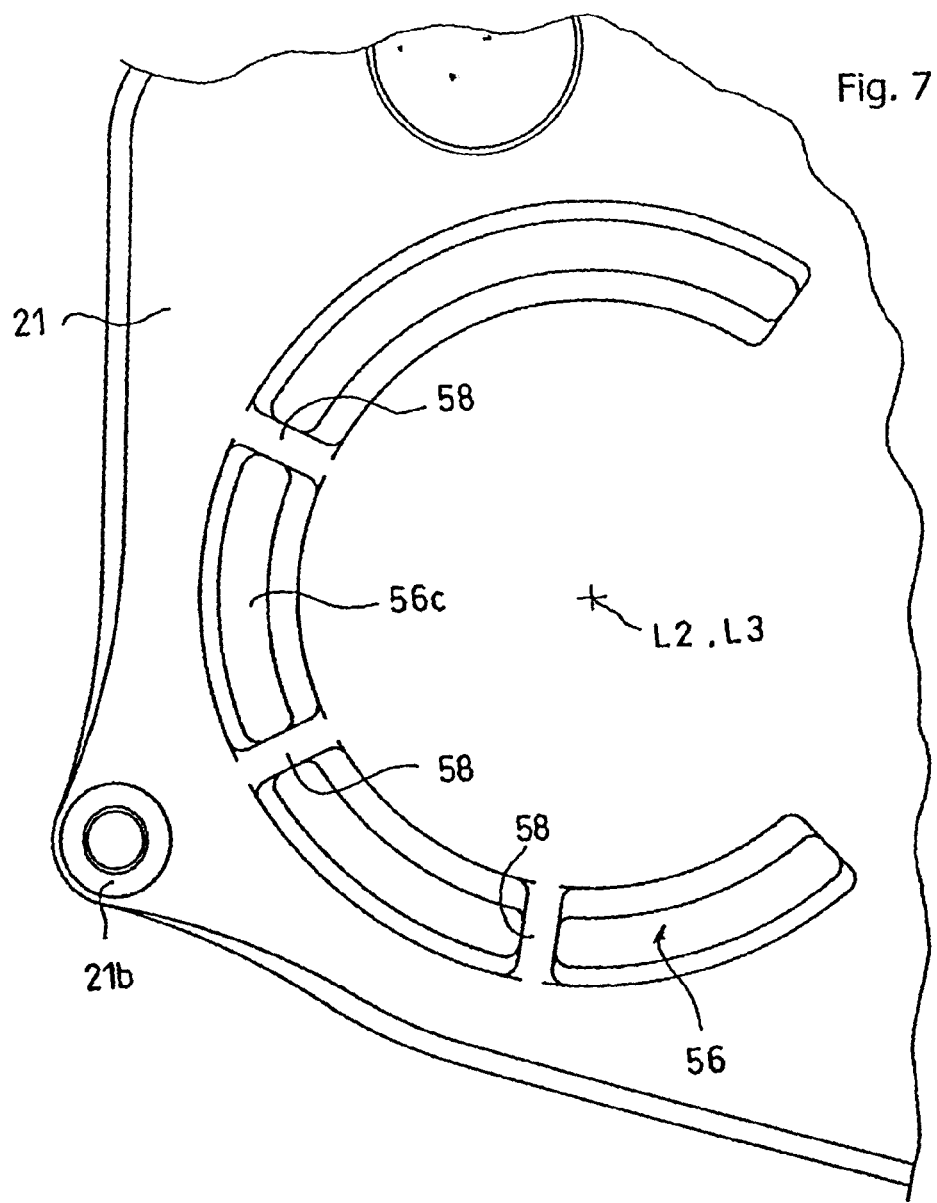
FIG. 7 is a side view of the main part of the case of the gear-shifting apparatus of FIG. 1, as viewed in the direction of the arrow VII in FIG. 4.
Figure 8:
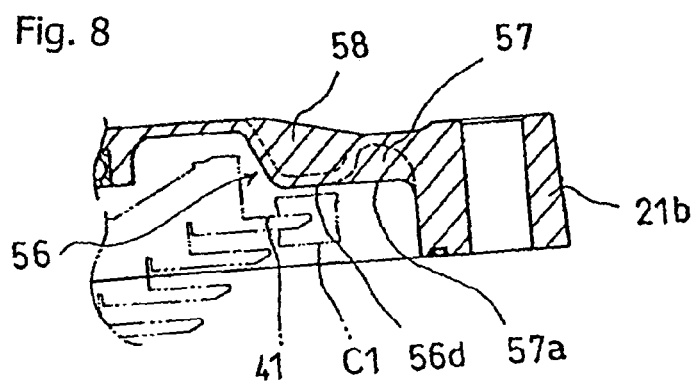
FIG. 8 is a cross-sectional view taken in the VIII-VIII line in FIG. 6.

Furthermore, when a portion of the chain is extremely slack in a position in the direction which the chain is pulled, the slackened portion of the chain is checked by the check part 53 of the chain-guiding member 50. This prevents the slackened portion of the chain from getting caught in the gear-shifting sprockets 41 to 47. In addition to that, the slackened portion of the chain is guided along the check part 53 towards the guide part 51. Accordingly, the slackened portion of the chain constitutes a stagnant portion C2 which makes the slackened portion of the chain temporarily stagnate in a position toward the sprocket cluster 40 from the drive input sprocket 32 and the opening 52, the position being between the guide part 51 and the sprocket cluster 40 (FIG. 6 shows a condition where a portion of the chain C stagnates). In this manner, the chain-guiding member 50 prevents the slackened portion of the chain C, which is generated in a position in the direction which the chain C is pulled, from getting stuck between the drive input sprocket 32 and the case 20. Moreover, the inner guide part 51*a* and the roller 51*b*2 also guide the chain C in a way that the stagnant portion C2 is sequentially drawn in a line and passes through the opening 52. In this respect, the chain guide member 50 is also chain-alignment means for aligning the stagnant portion C2.

Suppose that gear-shifting positions offered by the sprocket cluster 40 are bisected into low and high speed positions. With the portion of the chain C, in a position in a direction which the chain is pulled, the inner guide part 51*a* contacts a portion of the chain C hooked to one of the gear-shifting sprockets 44 to 47 which is a working sprocket in the high speed positions. The roller 51*b*2 contacts a portion of the chain C hooked to one of the gear-shifting sprockets 41 to 43 which is a working sprocket in the low speed positions.

As shown in FIGS. 2, 4 and 6 to 9, sprockets 41 and 47 are end sprockets positioned the outermost in the axis direction in the sprocket cluster 40, and concurrently are the most adjacent to the case 20 in the axis direction in the sprocket cluster 40. Of the two gear-shifting sprockets 41 and 47, the gear-shifting sprocket 41 is the closer to the case 20 in the axis direction. For the gear-shifting sprocket 41, the gear-shifting apparatus T is provided with a protruding part 56, using a part of the case 20, which is a check part for preventing the chain C from moving in the axis direction beyond the gear-shifting sprocket 41 while the derailer 70 moving in the axis direction is shifting the chain C to the gear-shifting sprocket 41.

Specifically, the protruding part 56 prevents the chain C from moving in the axis direction beyond the gear-shifting sprocket 41 lest the chain C should come too close to the first case 21, while the chain C is being shifted from one sprocket to another in the sprocket cluster 40. Such a protruding part 56 is provided integrally to the first case 21 which is a part of the case 20, in a position where the protruding part 56 overlaps a portion Cl of the gear-shifting sprocket 41 to which the chain C is hooked when viewed from the side. With regard to the protruding part 56, a top part 56*c* which is positioned in the axis direction has a top surface 56*d* which is a check surface for checking the chain C from moving in the axis direction. Accordingly, the chain C comes into contact with the top surface 56*d* when the chain C is about to move in the axis direction beyond the gear-shifting sprocket 41. This prevents the chain C from coming off from the gear-shifting sprocket 41.

The protruding part 56 includes a first part 56*a* and a second part 56*b*. The first part 56*a* overlaps the portion C1 of the gear-shifting sprocket 41 to which the chain C is hooked, when viewed from the side. The second part 56*b* extends into the first part 56*a*, and extends longer in the forward rotational direction A0 than the first part 56*a* near a position of the gear-shifting sprocket 41 from which the chain C is caused to lead out. The second part 56*b* extends from the first part 56*a* toward the check part 53 of the chain guide member 50. When the crankshaft 12 does not make a forward rotation, or in an equivalent case, the chain guide member 50 causes the stagnant portion C2 on the chain C. When a gear-shifting operation under such a condition causes a guide pulley 72 to move in the axis direction towards the gear-shifting sprocket 41, the second part 56*b* prevents the stagnant portion C2 from coming closer in the axis direction to the first case 21 beyond the gear-shifting sprocket 41.

In addition, a reinforcement rib is molded integrally with, and provided to, the first case 21. The reinforcement rib extends in the radial direction of the gear-shifting sprocket 41 from the protruding part 56. The reinforcement rib includes a plurality of inner ribs 57 and a plurality of outer ribs 58. The inner ribs 57 extend outwards in the radial direction from the protruding part 56, and are provided at intervals in the circumferential direction. The outer ribs 58 are provided to the protruding part 56 at intervals in the circumferential direction. The inner ribs 57 are provided so as to protrude in the same axis direction as the protruding part 56 does. A top surface 57*a* in the axis direction of each of the inner ribs 57 are located in almost the same position as the top surface 56*d*. Each of the outer ribs 58 is provided in a position at the same angle as corresponding one of the inner ribs 58 is, with the centerline L3 of rotation defined as the center, when viewed from the side. The number of the outer ribs 58 thus provided is the same as the number of the inner ribs 57.

As shown in FIGS. 1 to 3, the gear-shifting mechanism M2 is provided with a gear-shifting operation mechanism 60 and the derailer 70. The derailer 70 is a changing mechanism for changing the chain C from one sprocket to another within the sprocket cluster 40 in response to a gear-shifting operation through the gear-shifting operation mechanism 60. The chain C is hooked to the drive input sprocket 32, a working sprocket, the guide pulley 72 and a tension pulley 82. The guide pulley 72 and the tension pulley 82 are arranged in a slackened portion of the chain C driven by the forward rotating crankshaft 12.

The gear-shifting operation mechanism 60 is connected to the derailer 70 in the case 20. The gear-shifting operation mechanism 60 is provided with a gear-shifting operation member 61 and an operation cable 62. The gear-shifting operation member 61 includes a gear-shifting lever operated by the rider and the like. The operation cable 62 is an operation force transmitting member for operationally connecting the gear-shifting operation member 61 and the derailer 70 for the purpose of transmitting the operation of the gear-shifting operation member 61 to the derailer 70. The operation cable 62 includes an outer cable 62*a* and an inner cable 62*b*. The outer cable 62*a* is tubular, and is held by the bicycle frame F. The inner cable 62*b* is inserted inside the outer cable 62*a*. One end part of the inner cable 62*b* is connected to the gear-shifting operation member 61, and the other end part of the inner cable 62*b* is connected to the derailer 70.

As shown in FIGS. 2 to 5 and 9, the derailer 70 is arranged above the main shaft 12*a* of the crankshaft 12, and is provided with a base part 71, the guide pulley 72, a holder H, a parallelogram link mechanism 73 and a tensioner 74. The base part 71 is fixed to, and is held by, the two case parts 21 and 22, and is provided with a holding part 71*a* for the outer cable 62*a*. The base part 71 is shaped like a cylinder. The guide pulley 72 is a guide member for guiding the chain C in such a way that the chain C is hooked to a working sprocket when the chain C is intended to be moved among the gear-shifting sprockets 41 to 47. The holder H rotatably supports the guide pulley 72. The parallelogram link mechanism 72 links the base part 71 and the holder H together, and has a pair of links 73*a* and 73*b*. The pair of links 73*a* and 73*b* are an operation mechanism for moving the holder H and the guide pulley 72 in the axis direction and in the radial direction of the centerline L3 of rotation in response to a gear-shifting operation through the gear-shifting operation mechanism 60. The tensioner 74 provides a tension force to the chain C.

The holder H includes a first holder part 76 and a second holder part 77 as well as a supporting part 78. The first holder part 76 and the second holder part 77 are arranged respectively in a left part and a right part of the guide pulley 72, which are the two sides of the guide pulley in the axis direction. The first holder part 76 and the second holder part 77 are linked to each other with a pair of rivets 75a and 75b. The guide pulley 72 has its own centerline L4 of rotation which is in parallel with the centerline L3 of rotation. The supporting part 78 rotatably supports the guide pulley 72. The supporting part 78 includes a collar 78a and a bearing 78b. The collar 78a is fitted to the outside of the rivet 75a which is a part for linking the first holder part 76 and the second holder part 77. The collar 78a controls an interval in the axis direction between the first holder part 76 and the second holder part 77. The bearing 78b is fitted to the outside of the collar 78a, and supports the guide pulley 72. An inner portion 78b1 of the bearing 78b is swingably supported by the collar 78a. The inner portion 78b1 controls an interval in the axis direction between a first arm part 100 and a second arm part 120, which will be described later. The inner portion 78b1 swings integrally with the two arm parts 100 and 120, which are connected to the inner 78b1 portion through a pressed insertion.

The first holder part 76 is arranged in the left of the guide pulley 72, and includes a plate-shaped member. The second holder part 77 is provided with a linking part 79 and a spring containing part 80. The linking part 79 is arranged outwards in the radial direction of the guide pulley 72. The pair of links 73a and 73b are linked to the linking part 79 through a swingable mounting. The spring containing part 80 is arranged in the right of the guide pulley 72, and contains a tension spring 83. In addition, the two links 73a and 73b of the parallelogram link mechanism 73 are mounted on the base part 71 with a pair of supporting axles 81 which are provided to the base part 71. The inner cable 62b is held by, and engaged with, a linking part 73b1 of the link 73b. When operated through the inner cable 62b, the two links 73a and 73b swing respectively about a pair of centerlines of swing defined by the supporting axles 81, and guides the guide pulley 72 along a tooth-tip circle cluster which includes circles drawn by tooth-tips of the gear-shifting sprockets 41 to 47.

As additionally shown in FIG. 11, the spring containing part 80 has a peripheral wall 80a which constitutes a second extending part opposing a first extending part 106, which will be described later. The peripheral wall 80a is arranged to the right of the orbital plane P1 of the guide pulley 72, when viewed in the axis direction. Specifically, the spring containing part 80 is provided in a position adjacent in the axis direction to a second arm part 120, which will be described later. The spring containing part 80 has the peripheral wall 80a in a position to the right of the second arm part 120. The peripheral wall 80a extends to the right of the orbital plane P1, in a direction away from the orbital plane P1, and in a direction in parallel with the axis direction. The peripheral wall 80a has a part of an outer peripheral surface, which is made of a cylindrical surface, as a guide surface 80b. In addition, an interval in the axis direction between the second arm part 120 and the spring containing part 80 is extremely small in comparison to the width W4 in the axis direction of the chain C. As described later, the interval in the axis direction between the second arm part 120 and the spring containing part 80 is set to be small enough not to hinder the chain C from moving when a derailed portion C13 of the chain C is returning to an engaged condition with the guide pulley 72 while sliding on the guide surface 80b of the peripheral wall 80.

At this point, the orbital plane P1 of the guide pulley 72 is defined as a plane crossing multiple teeth 72a (see FIGS. 9 and 10) of the guide pulley 72, the multiple teeth engaging with the chain C. The orbital plane P1 is orthogonal to the centerline L4 of rotation. FIG. 11 shows the orbital plane P1 crossing the teeth 72a.

As shown in FIGS. 2 and 4, the tensioner 74 is provided with the tension pulley 82, an arm R and the tension spring 83. The tension pulley 82 applies a tension to the chain C by pressing the chain C between the drive input sprocket 32 and the guide pulley 72. The arm R is arranged in the axis direction between the first holder part 76 and the second holder part 77, and is integrally connected with the supporting part 78 of the holder H through a forcible insertion, and rotatably supports the tension pulley 82. In addition, the holder H and the arm R constitute a pulley support member in the derailer 70.

The arm R includes the first arm part 100 and the second arm part 120, which are paired with each other, as well as a supporting part 84. The first arm part 100 and the second arm part 120 are arranged respectively in positions left and right of the tension pulley 82, the positions being two sides in the axis direction of the tension pulley 82. Concurrently, the first arm part 100 and the second arm part 120 are arranged in the axis direction between the first holder part 76 and the second holder part 77. The supporting part 84 rotatably supports the tension pulley 82.

The first arm part 100 is provided with a guide-pulley-side guide part 101 and a tension-pulley-side guide part 102, and the second arm part 120 is provided with a guide-pulley-side guide part 121 and a tension-pulley-side guide part 122. The guide-pulley-side guide parts 101 and 121 prevent the chain C from coming off from the guide pulley 72, and are supported parts which are supported by the supporting part 78. The tension-pulley-side guide parts 102 and 122 support the supporting part 84, and prevent the chain C from coming off from the tension pulley 82. Furthermore, the supporting part 84 includes a rivet 84a and a bearing 84b. The rivet 84a is a part linking the first arm part 100 and the second arm part 120. The bearing 84b is fitted to the outside of the rivet 84a, and supports the tension pulley 82.

An interval W1 in the axis direction between the two guide-pulley-side guide parts 101 and 121, which is controlled by the inner 78b1 of the bearing 78b, is set to be larger than an interval W2 in the axis direction between the two tension-pulley-side guide parts 102 and 122, which is controlled by the inner 84b1 of the bearing 84b. Additionally, a width in the axis direction of the guide pulley 72 is larger than a width in the axis direction if the tension pulley 82.

The tension spring 83 includes springs 83a and 83b, each of which is made of two return coil springs respectively with different diameters. The two springs 83a and 83b are arranged concentrically in the spring containing part 80. One end of each of the springs 83a and 83b is engaged with, and held by, the spring containing part 80. The other ends respectively of springs 83a and 83b are respectively engaged with, and held by, engagement parts 120a and 120b of the second arm part 120 (see FIG. 10). With their respective spring forces, the spring 83a and 83b energize the arm R and the tension pulley 82 clockwise about the centerline L4 of rotation in FIG. 2, thereby pressing the tension pulley 82 against the chain C. Then, the tension pulley 82 swings along with the arm R. Accordingly, the tension force on the chain C is adjusted by the spring forces respectively of the springs 83a and 83b.

Figure 9:
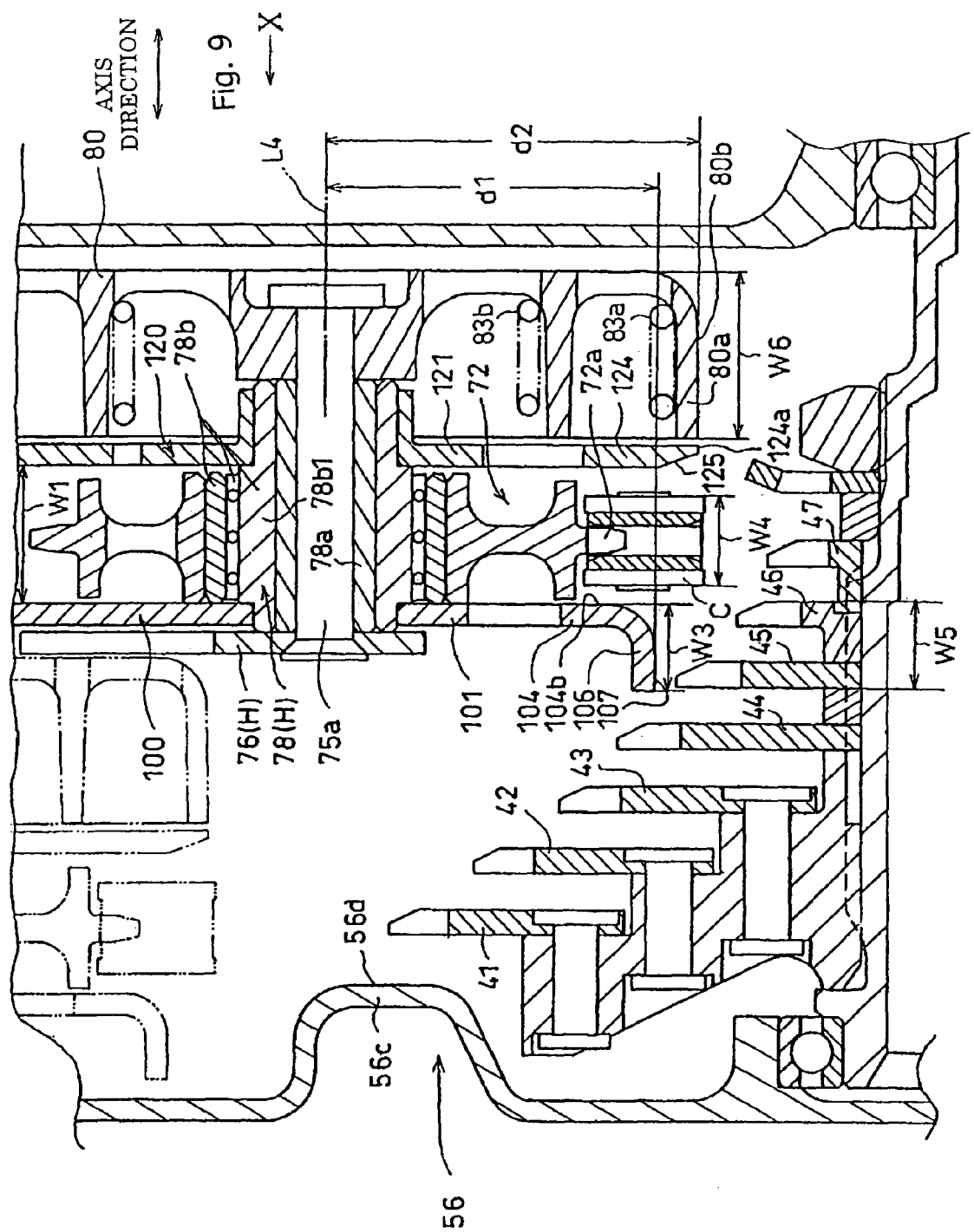
FIG. 9 is an enlarged view of a main part of FIG. 4. In addition, solid lines show the arm which is located in the fastest gear-shifting position. Long dashed double-short dashed lines show the arm which is located in the slowest gear-shifting position.
Figures 10A, 10B:
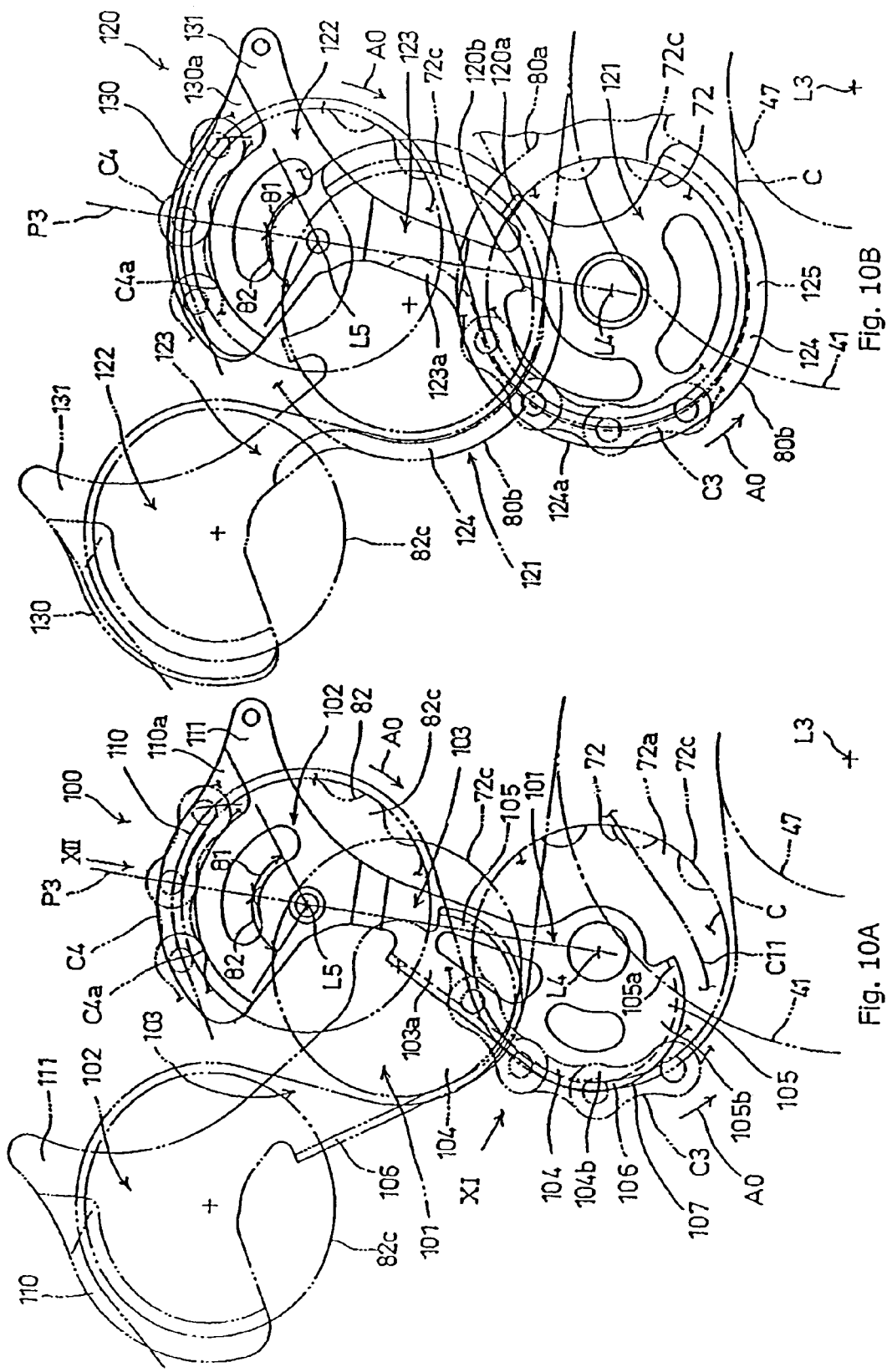
FIG. 10(A) is a left side view of the arm provided to the derailer of the gear-shifting apparatus of FIG. 1, as viewed in the direction opposite the arrow X in FIG. 9. In addition, solid lines show the arm located in the fastest gear-shifting position. Long dashed double-short dashed lines show the arm located in the slowest gear-shifting position.
FIG. 10(B) is a right side view of the arm provided to the derailer of the gear-shifting apparatus of FIG. 1, as viewed in the direction of the arrow X in FIG. 9. In addition, solid lines show the arm located in the fastest gear-shifting position. Long dashed double-short dashed lines show the arm located in the slowest gear-shifting position.

As shown in FIGS. 9 and 10, the first arm part 100 is a plate-shaped member in which the guide-pulley-side guide part 101, the tension-pulley-side guide part 102 and a linking part 103 are integrally molded. The guide-pulley-side guide part 101 is shaped like a fan, and is formed in a range in a circumferential direction of the guide pulley 72, the range including a part C3 of the guide pulley 72 to which the chain C is hooked. The tension-pulley-side guide part 102 is shaped like a fan, and is formed in a range in a circumferential direction of the tension pulley 82, the range including a part C4 of the tension pulley 82 to which the chain C is hooked. The linking part 103 links the two guide parts 101 and 102.

The guide-pulley-side guide part 101 includes a larger-diameter outer peripheral edge part 104 and a smaller-diameter outer peripheral edge part 105. The larger-diameter outer peripheral edge part 104 is provided near a position of the guide pulley 72 where the chain C is caused to lead in. The smaller-diameter outer peripheral edge part 105 extends into the larger-diameter outer peripheral edge part 104, and is provided near a position of the guide pulley 72 where the chain C is caused to lead out. The larger-diameter outer peripheral edge part 104 is arranged in a position which makes the larger-diameter outer peripheral edge part 104 overlap the part C3 of the guide pulley 72 to which the chain C is hooked when viewed from the side. The smaller-diameter outer peripheral edge part 105 is positioned in the radial direction inward of the larger-diameter outer peripheral edge part 104 and the part C3 of the guide pulley 72 to which the chain C is hooked, and is positioned near the centerline L4 of rotation. In addition, the smaller-diameter outer peripheral edge part 105 has an end part 105a in the circumferential direction in a position crossing the center plane P3, which will be described later. Furthermore, the linking part 103 constitutes a derailment prevention part for preventing the chain C from coming off leftwards from the guide pulley 72 near the position of the guide pulley 72 where the chain C is caused to lead in.

Figure 11:
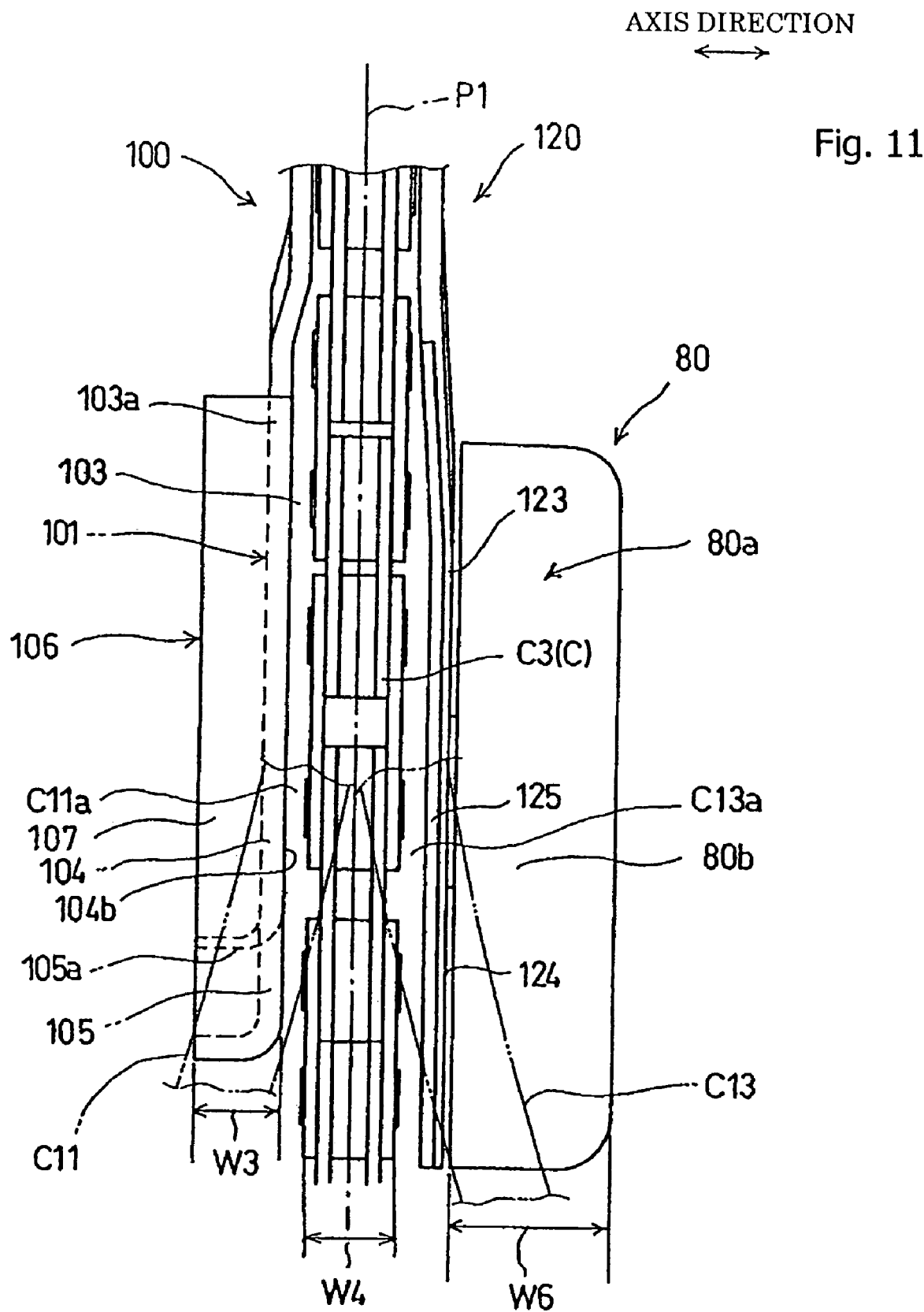
FIG. 11 is a schematic view of a holder and an arm which are provided to the derailer as viewed in the direction of the arrow XI in FIG. 10(A).

As shown in FIG. 11, the two outer peripheral edge parts 104 and 105 are provided in common with the first extending part 106 which extends in the axis direction to the left of the orbital plane P1 of the guide pulley 72, in a direction away from the orbital plane P1, and in a direction in parallel with the axis direction. The first extending part 106, which is arranged in the axis direction to the left of the orbital plane P1 of the guide pulley 72, extends in both of the two outer peripheral edge parts 104 and 105. In addition, the first extending part 106 also continuously extends to an end part 103a of the linking part 103 near the portion of the guide pulley 72 which leads in the chain C in a way that the continuous extension reaches a position which overlaps with the tension pulley 82 in the axis direction. Furthermore, the extending part 106 is molded so as to be shaped like an arc in the two outer peripheral edge parts 104 and 105, and is molded so as to be shaped like a straight line in the end part 103a of the linking part 103. Moreover, the extending part 106 is molded in a way that the guide-pulley-side guide part 101 and the linking part 103 are folded in parallel with the axis direction. The extending part 106 is formed integrally with the guide-pulley-side guide part 101 and the linking part 103, and further integrally with the first arm part 100.

A guide surface 107 constituted of a outer peripheral surface of the extending part 106 extends in a direction away from the orbital plane P1, or to the left of the orbital plane P1 and in a direction almost in parallel with the axis direction. The guide surface 107 extends smoothly into surfaces 104b and 105b which are opposite to the guide pulley 72 in the two outer peripheral edge parts 104 and 105. In addition, a width W3 in the axis direction of the extending part 106, and at the same time of the guide plane 107, is almost equal to the width W4 in the axis direction of the chain C. The width W3 is also almost equal to the width W5 in the axis direction occupied by two of the gear-shifting sprockets 41 to 47, the two being next to each other in the axis direction of the sprocket cluster 40 (FIG. 9) shows a width which is occupied by two gear-shifting sprockets 45 and 46 as a representative example of the width W5). Moreover, a width W6 in the axis direction of the peripheral wall 80a of the spring containing part 80, and at the same time of the guide surface 80b, is set so as to be larger than the width W3 of the extending part 106, and at the same time of the guide surface 107.

In addition, the extending part 106 and the guide surface 107 in the smaller-diameter outer peripheral edge part 105 are positioned so as to be closer to the centerline L4 of rotation than the extending part 106 and the guide surface 107 in the larger-diameter outer peripheral edge part 104 in a position which makes the larger-diameter outer peripheral edge part 104 overlap the part of the guide pulley to which the chain C is hooked when viewed from the side. The extending part 106 and the guide surface 107 in the smaller-diameter outer peripheral edge part 105 are also positioned so as to be closer to the centerline L4 of rotation than a rotation track 72c in the outermost peripheral end of the guide pulley 72. Furthermore, as the smaller-diameter outer peripheral end part 105 comes closer to the end part 105a from a position near the larger-diameter outer peripheral end part 104, the distance between the centerline L4 of rotation and a group of the extending part 106 and the guide surface 107 in the smaller-diameter outer peripheral edge part 105 continuously becomes smaller. Accordingly, the extending part 106 and the guide surface 107 come gradually closer to the centerline L4 of rotation.

Figure 12:
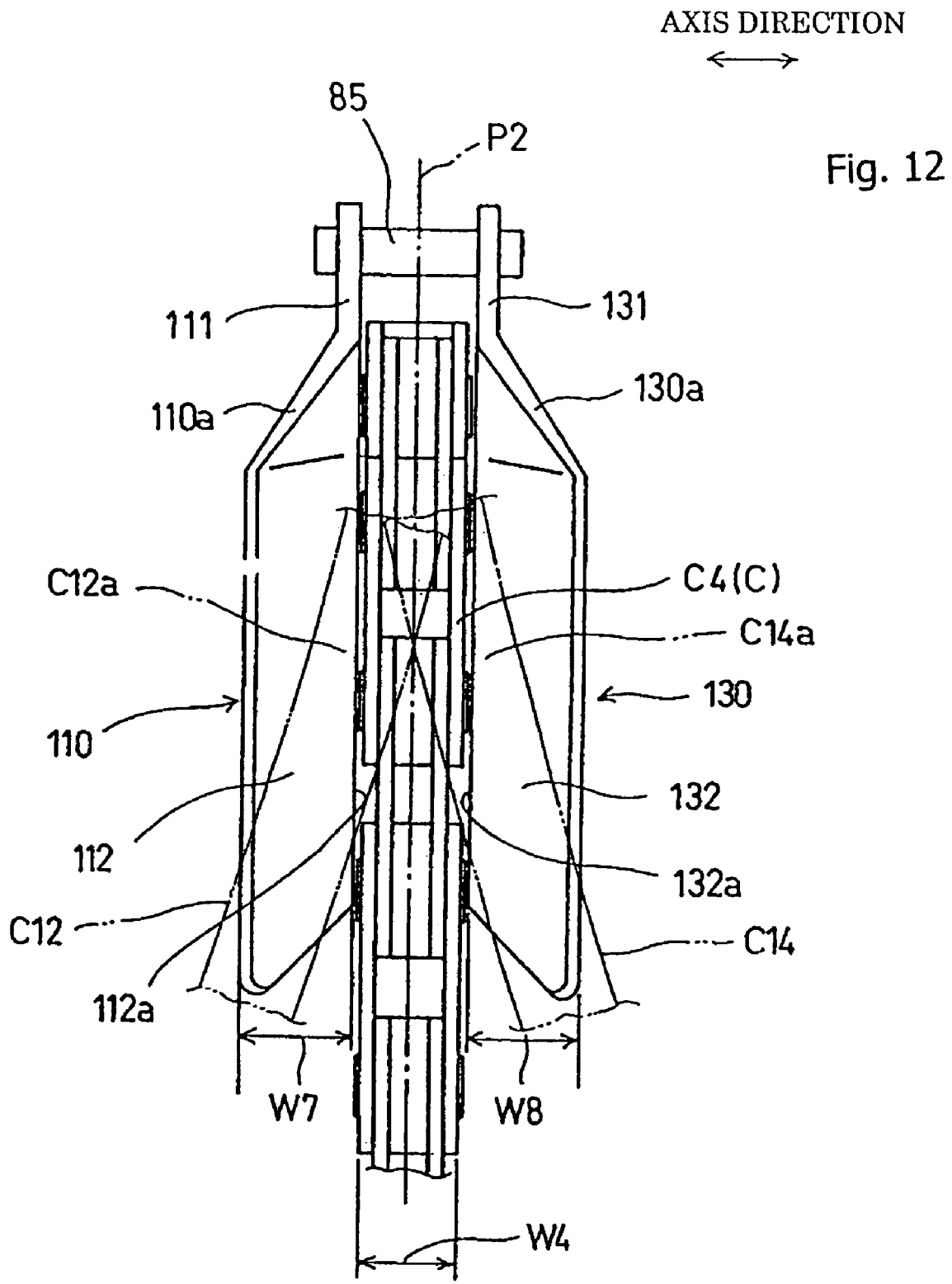
FIG. 12 is a schematic view of the arm which is provided to the derailer as viewed in the direction of the arrow XII in FIG. 10(A).

As shown in FIGS. 4, 10 and 12, the tension-pulley-side guide part 102 includes a first engagement recovery-guiding part 110 and a derailment prevention part 111 near the part of the tension pulley 82 which leads in the chain C. The first engagement recovery-guiding part 110 includes an outer peripheral edge part which is provided so as to cover a range where the tension-pulley-side guide part 102 is formed in the circumferential direction. The derailment prevention part 111 is provided in a position in the forward rotational direction A0 of the tension pulley 82 from the engagement recovery-guiding part 110, and prevents the chain C from coming off from the tension pulley 82.

A derailed part C12 is part of the chain C which is derailed in the axis direction from the orbital plane P2 of the tension pulley 82, and descriptions will be provided for the derailed part C12. The first engagement recovery-guiding part 110 is formed through folding the first engagement recovery-guiding part 110 in a way that the outer peripheral edge part of the tension-pulley-side guide part 102 tilts in a direction which makes the outer peripheral edge part of the tension-pulley-side guide part 102 go leftwards in the axis direction away from the orbital plane P2 as the outer peripheral edge part of the tension-pulley-side guide part 102 goes outwards in the radial direction of the tension pulley 82. The first engagement recovery-guiding part 110 is an extending part which extends in the axis direction leftwards from a portion of the tension-pulley-side guide part 102, the portion being opposite to the tension pulley 82. Furthermore, the engagement recovery-guiding part 110 has a guide surface 112 which is formed of an inclined surface made of a circular conic surface facing outwards in the radial direction. In other words, the engagement recovery-guiding part 110 has a guide surface 112 which is formed of an inclined surface tilting in a direction which makes the inclined surface go leftwards away from the orbital plane P2 as the inclined surface goes outwards in the radial direction. Moreover, an end part 112a of the guide surface 112 which is the closest to the tension pulley 82 in the axis direction is positioned in an innermost position of the guide surface 112 in the radial direction. The end part 112a of the guide surface 112 is positioned in almost the same position as inner edge parts in the radial direction of a part of the chain C which engages with the tension pulley 82 is positioned. In other words, the end part 112a of the guide surface 112 is positioned in almost the same position as inner edge parts C4a in the radial direction of the part C4 of the tension pulley 82 to which the chain C is hooked is positioned.

At this point, the orbital plane P2 of the tension pulley 82 is a plane crossing a multiple of teeth 82a which are parts of the tension pulley 82 engaging with the chain C (see FIG. 10), and which is orthogonal to the centerline L5 of rotation. (FIG. 12 shows one of orbital planes which cross the teeth 82a.)

A width W7 in the axis direction of the engagement recovery-guiding part 110 is almost equal to the width W4 of the chain C. In addition, the range where the tension-pulley-side guide part 102 is formed is set in a range which makes an angle θ1 and an angle θ2 (see FIG. 10) almost equal to each other. When viewed from the side, the angle θ1 is an angle to the center plane P3 which is measured in the forward rotational direction A0 about the centerline L5 of rotation, and the angle θ2 is an angle to the center plane P3 which is measured in the backward rotational direction about the centerline L5, while the center plane P3 is defined as including the centerline L4 of rotation of the guide pulley 72 and the centerline L5 of rotation of the tension pulley 82. As a whole, the tension-pulley-side guide part 102 is set in the range which causes a total of the angle θ1 and the angle θ2 to the centerline L5 of rotation to be an obtuse angle. Furthermore, the derailment prevention part 111 extends outwards in the radial direction beyond the engagement recovery-guiding part 110. In a position outwards in the radial direction beyond the part C4 of the tension pulley to which the chain C is hooked, the derailment prevention part 111 is linked with a derailment prevention part 131 of the tension-pulley-side guide part 122 in the second arm part 120 with a rivet 85 which is a linking part.

FIGS. 9, 10, and 11, the second arm part 120 is a plate-shaped member in which the guide-pulley-side guide part 121, the tension-pulley-side guide part 122 and a linking part 123 are formed integrally with one another. The guide-pulley-side part 121 is fan-shaped, and is formed in a range in the circumferential direction of the guide pulley 72, the range including the part C3 of the guide pulley 72 to which the chain C is hooked. The tension-pulley-side part 122 is fan-shaped, and is formed in a range in the circumferential direction of the tension pulley 82, the range including the part C4 of the tension pulley 82 to which the chain C is hooked. The linking part 123 links the two guide parts 121 and 122 together.

The guide-pulley-side guide part 121 includes an outer peripheral edge part 124 which is provided in a range between the part of the guide pulley 72 which leads in the chain C and the part of the guide pulley 72 which leads out the chain C. The outer peripheral edge part 124 is located in a position which makes the outer peripheral edge part 124 seem to overlap the part C3 of the guide pulley to which the chain C is hooked when viewed from the side. With regard to the outer peripheral edge part 124, an inclined surface 125 is formed in a position outwards in the radial direction of the guide pulley 72 beyond the rotation track 82c of the outermost peripheral edge of the guide pulley 72. The inclined surface 125 tilts in a direction which makes the inclined surface 125 go rightwards in the axis direction away from the orbital plane P1 as the inclined surface 125 goes outwards in the radial direction. In addition, the inclined surface 125 is formed in the end part 123a of the linking part 123 near the part of the guide pulley 72 which leads in the chain C. The inclined surface 125 is formed so as to extend to a position which the inclined surface 125 seem to overlap the tension pulley 82 when viewed from the above.

Furthermore, the diameter of the outer peripheral edge part 124 is larger than the diameter of the larger-diameter outer peripheral edge part 104 of the first arm part 100. An outermost edge 124a is a part of the outer peripheral edge part 124 extending into the inclined surface 125, the part being outwards in the radial direction of the guide pulley. The outermost edge 124a is formed of a cylinder surface having a diameter equal to that of the guide surface 80b of the peripheral wall 80a of the spring containing part 80. The outermost edge 124a is located in the same position as the guide surface 80b of the spring containing part 80 is located, when viewed in the radial direction. Accordingly, the distance d2 between the centerline L4 of rotation and the guide surface 80b is equal to the distance d2 between the centerline L4 of rotation and the outermost edge 124a. The distance d1 between the centerline L4 of rotation and the guide surface 107 is smaller than the distance d2. Moreover, the linking part 123 constitutes a derailment prevention part which prevents the chain C from coming off rightwards from the guide pulley 72 and the tension pulley 82.

As shown in FIGS. 4, 10, 12, the tension-pulley-side guide part 122 is formed so as to be symmetrical to the tension-pulley-side guide part 102 of the first arm part 100 along a symmetrical plane which is a plane orthogonal to the centerline L5 of rotation. The tension-pulley-side guide part 122 has a second engagement recovery-guiding part 130 and the derailment prevention part 131. The second engagement recovery-guiding part 130 includes an outer peripheral edge part which is provided near the part of the tension pulley 82 which leads in the chain C, so as to cover a range in the circumferential direction where the tension-pulley-side guide part 122 is formed, in common with the engagement recovery-guiding part 110. The derailment prevention part 131 is similar to the derailment prevention part 111.

A derailed portion C14 is part of the chain C which is derailed in the axis direction from the orbital plane P2 of the tension pulley 82. The second engagement recovery-guiding part 130 causes the derailed portion C14 to engage with the tension pulley 82 again. The second engagement recovery-guiding part 130 is formed through folding the second engagement recovery-guiding part 130 in a way that the outer peripheral edge part of the tension-pulley-side guide part 122 tilts in a direction which makes the outer peripheral edge part of the tension-pulley-side guide part 122 go rightwards in the axis direction away from the orbital plane P2 as the outer peripheral edge part of the tension-pulley-side guide part 122 goes outwards in the radial direction of the tension pulley 82. The second engagement recovery-guiding part 130 is an extending part which extends in the axis direction rightwards from a portion of the tension-pulley-side guide part 122, the portion being opposite to the tension pulley 82. Furthermore, the engagement recovery-guiding part 130 has a guide surface 132 which is formed of an inclined surface made of a circular conic surface facing outwards in the radial direction. In other words, the engagement recovery-guiding part 130 has a guide surface 132 which is formed of an inclined surface tilting in a direction which makes the inclined surface go rightwards away from the orbital plane P2 as the inclined surface goes outwards in the radial direction. Moreover, an end part 132a of the guide surface 132 which is the closest to the tension pulley 82 in the axis direction is positioned in an innermost position of the guide surface 132 in the radial direction. The end part 132a of the guide surface 132 is positioned in almost the same position as inner edge parts C4a in the radial direction of the part C4 of the tension pulley 82 to which the chain C is hooked is positioned.

The width W8 in the axis direction of the engagement recovery-guiding part 130 is almost equal to the width W4 of the chain C. In addition, the range in the circumferential direction where the tension-pulley-side guide part 122 is formed is similar to the range in the circumferential direction where the tension-pulley-side guide part 102 is formed with regard to the engagement recovery-guiding part 110. Furthermore, the derailment prevention part 131 extends outwards in the radial direction beyond the engagement recovery-guiding part 130.

The engagement recovery-guiding parts 110 and 130 include the respective tapered guide parts 110a and 130a which make the interval in the axis direction between the two engagement recovery-guiding parts 110 and 130 smaller as the engagement recovery-guiding parts 110 and 130 go in the forward rotational direction A0 respectively towards the derailment prevention parts 111 and 131.

Next, descriptions will be provided for a function in which the extending part 106, the peripheral wall 80a of the spring containing part 80, and the pair of engagement recovering parts 110 and 130 guide the chain C in the case where a gear-shifting operation is performed when the gear-shifting sprockets 41 to 47 make a backward rotation or are halted, in other words, when the gear-shifting sprockets 41 to 47 do not make a forward rotation, for example, while the bicycle B is in a state of moving backwards or when the bicycle B is stopped.

As shown in FIGS. 3, 4, and 10 to 12, if an operation of the gear-shifting operation mechanism 60 is intended to move the chain to a faster gear-shifting position while the gear-shifting sprockets 41 to 47 are not making a forward rotation, an operation of the parallelogram link mechanism 73 of the derailer 70 moves the guide pulley 72 and the tension pulley 82 along with the holder H and the arm R rightwards. Accordingly, the part C3 of the guide pulley 72 to which the chain C is hooked and the part C4 of the tension pulley 82 to which the chain C is hooked are moved rightwards along with the guide pulley 72 and the tension pulley 82. By contrast, a part of one of the gear-shifting sprocket 41 to 47 to which the chain C is hooked does not move rightwards. In addition, a part of the drive input sprocket 32 to which the chain C is hooked does not move to a position corresponding to the guide pulley 72 and the tension pulley 82. For this reason, the part C3 of the guide pulley 72 to which the chain C is hooked and the part C4 of the tension pulley 82 to which the chain C is hooked move leftwards from a position where the part C3 of the guide pulley 72 to which the chain C is hooked and the part C4 of the tension pulley 82 to which the chain C is hooked are hindered from moving leftwards by the linking part 103 and the derailment prevention part 111. As a result, in some cases, the part C3 of the guide pulley 72 to which the chain C is hooked and the part C4 of the tension pulley 82 to which the chain C is hooked may come off from the orbital planes P1 and P2 near the linking part 103 and the derailment part 111. In other words, the part C3 of the guide pulley 72 to which the chain C is hooked and the part C4 of the tension pulley 82 to which the chain C is hooked may come off from the guide pulley 72 and tension pulley 82.

At this point, a position near the linking parts 103 and 123 is a starting part C11a where the chain C begins to come off. A position near the derailment prevention parts 111 and 131 is a starting part C12a where the chain C begins to come off. A derailed part C11 is a part of the chain C which begins to come off at the starting part C11a. A derailed part C12 is a part of the chain C which begins to come off at the starting part C12a. With regard to the guide pulley 72, the derailed part C11 goes onto the extending part 106 or the guide surface 107, for example, as shown by a long dashed double-short dashed line in FIG. 11. With regard to the tension pulley 82, the derailed part C12 goes onto the engagement recovery-guiding part 110 or the guide surface 112, for example, as shown by a long dashed double-short dashed line in FIG. 12.

While the derailed part C11 is in this state, the extending part 106 positions a part of the derailed part C11, which is near the part of the guide pulley 72 leading in the chain C, outwards in the radial direction beyond the rotation track 72c of the guide pulley 72. In addition, when the rider does such as drive the crankshaft 12 in the forward rotational direction A0 and thus the gear-shifting sprocket 41 to 47 make a forward rotation, the extending part 106 guides the derailed part C11 which has gone onto the extending 106 in a way that a tension force on the chain C at this time causes the derailed part C11 to slide on the guide surface 107, to move towards the orbital plane P1, and to thereafter engage with the guide pulley 72.

When a gear-shifting operation is intended to move the chain C to a faster gear-shifting position, if the gear-shifting operation skips several gear-shifting sprockets, or if a similar condition occurs, a difference in outer diameter between a sprocket which is in operation after a gear-shifting operation and a sprocket which has been in operation before the gear-shifting operation becomes larger. Even in such a case, out of the extending parts 106, the extending part 106 of the smaller-diameter outer peripheral edge part 105 contributes to securely causing the derailed part C11 to go onto the extending part 106 as shown by a long dashed short dashed line in FIG. 10. Accordingly, the extending part 106 enables the derailed part C11 to securely go onto the extending part 106 without causing the derailed part C11 to come off from the extending part 106 in a comparison with a case where the distance between the centerline L4 of rotation and the extending part 106 of the smaller-diameter outer peripheral edge part 105 is equal to the distance between the centerline L4 of rotation and the extending part 106 of the larger-diameter outer peripheral edge 104.

On the other hand, the engagement recovery-guiding parts 110 and 130 position the entire derailed part C12 outwards in the radial direction beyond the rotation track 82c of the tension pulley 82. In addition, when the rider does such as drive the crankshaft 12 in the forward rotational direction A0 and thus the gear-shifting sprocket 41 to 47 make a forward rotation, the engagement recovery-guiding parts 110 and 130 guides the derailed part C12 in a way that a tension force on the chain C causes the derailed part C12 to move towards the orbital plane P2, and to thereafter engage with the tension pulley 82.

If an operation of the gear-shifting operation mechanism 60 is intended to move the chain to a slower gear-shifting position while the gear-shifting sprockets 41 to 47 are not making a forward rotation, an operation of the parallelogram link mechanism 73 moves the guide pulley 72 and the tension pulley 82 leftwards. Accordingly, the part C3 of the guide pulley 72 to which the chain C is hooked and the part C4 of the tension pulley 82 to which the chain C is hooked are moved leftwards along with the guide pulley 72 and the tension pulley 82. By contrast, a part of one of the gear-shifting sprocket 41 to 47 to which the chain C is hooked does not move leftwards. In addition, a part of the drive input sprocket 32 to which the chain C is hooked does not move to a position corresponding to the guide pulley 72 and the tension pulley 82. For this reason, the part C3 of the guide pulley 72 to which the chain C is hooked and the part C4 of the tension pulley 82 to which the chain C is hooked move rightwards from a position where the part C3 of the guide pulley 72 to which the chain C is hooked and the part C4 of the tension pulley 82 to which the chain C is hooked are hindered from moving rightwards by the linking part 123 or the derailment prevention part 131. As a result, in some cases, the part C3 of the guide pulley 72 to which the chain C is hooked may come off from the orbital plane P1 near the linking part 123. In other cases, the part C4 of the tension pulley 82 to which the chain C is hooked may come off from the orbital plane P2 near the derailment part 131.

At this time, with regard to the guide pulley 72, the derailed part C13 out of the derailed parts goes onto the peripheral wall 80a or the guide surface 80b of the spring containing part 80, for example, as shown by a long dashed double-short dashed line in FIG. 11. With regard to the tension pulley 82, the derailed part C14 goes onto the engagement recovery-guiding part 130 or the guide surface 132, for example, as shown by a long dashed double-short dashed line in FIG. 12.

While the derailed part C13 is in this state, the peripheral wall 80a positions a part of the derailed part C13, which is near the part of the guide pulley 72 leading in the chain C, outwards in the radial direction beyond the rotation track 72c of the guide pulley 72. The peripheral wall 80a guides the derailed part C13 which has gone onto the peripheral wall 80a, in a way that the derailed part slides on the guide surface 80b, moves towards the orbital plane P1, and thereafter engages with the guide pulley 72, due to a tension force on the chain C which is caused by a forward rotation of the crankshaft 12. Furthermore, when a gear-shifting operation is intended to move the chain C to a slower gear-shifting position, if the gear-shifting operation skips several gear-shifting sprockets, or if a similar condition occurs, a difference in outer diameter between a sprocket which is in operation after a gear-shifting operation and a sprocket which has been in operation before the gear-shifting operation becomes larger. Even in such a case, since the width W6 of the peripheral wall 80a is larger than the width W3 of the extending part 106, this contributes to securely causing the derailed part C 13 to go onto the peripheral wall 80a. Accordingly, the peripheral wall 80a enables the derailed part C13 to more securely go onto the peripheral wall 80a without causing the derailed part C13 to come off from the peripheral wall 80a.

On the other hand, the engagement recovery-guiding part 130 positions the entire derailed part C14 outwards in the radial direction beyond the rotation track 82c of the tension pulley 82. In addition, the engagement recovery-guiding part 130 guides the derailed part C14 in a way that the derailed part C14 moves towards the orbital plane P2 and thereafter engages with the tension pulley 82 due to the tension force on the chain C which is caused by the forward rotation of the crankshaft 12.

In this manner, whether the guide pulley 72 and the tension pulley 82 move leftwards or rightwards in the axis direction in response to a gear-shifting operation, the derailed parts C11 and C12 are guided respectively by the extending part 106 and the engagement recovery-guiding part 110 so that the derailed parts C 11 and C12 return to conditions of engaging respectively with the guide pulley 72 and the tension pulley 82. The derailed parts C 13 and C 14 are guided respectively by the peripheral wall 80a and the engagement recovery-guiding part 130 so that the derailed parts C13 and C 14 return to conditions of engaging with the guide pulley 72 and the tension pulley 82. For this reason, the extending part 106 and the peripheral wall 80a of the spring containing part 80 constitute engagement recovering means for causing the derailed parts C 11 and C13, which has been derailed from the orbital plane P1 of the guide pulley 72, to engage with the guide pulley 72.

Next, descriptions will be provided for functions and effects of the embodiment configured in the aforementioned manner.

When the rider drives the crankshaft 12 in a forward rotational direction A0, or when the bicycle B runs forward while the crankshaft 12 is in a state of making a backward rotation or in a state of being in a halt, an operation of the gear-shifting operation member 61 causes the holder H of the derailer 70, the guide pulley 72, the arm R and the tension pulley 82 occupy a seventh gear-shifting position which is a basic position as shown by solid lines in FIGS. 2 to 4. Thus, the gear-shifting sprocket 47 out of the sprocket cluster 40 is selected as a working sprocket. Thereby, the chain C is hooked to the drive input sprocket 32 and the gear-shifting sprocket 47, which are located respectively in positions as shown by solid lines in FIGS. 3 and 4. The crankshaft 12, which rotates in a forward rotational direction A0 when the rider actuates the pedals, drives and rotates the drive input sprocket 32 through the unidirectional clutch 30. The drive input sprocket 32 drives and rotates the gear-shifting sprocket 47, the output axle 15, and the drive output sprocket 17 through the chain C with a gear-shifting ratio which is determined by the two sprockets 32 and 47. Moreover, the drive output sprocket 17 causes the driven sprocket 18 and the rear wheel Wr to rotate through the chain 19.

If the gear-shifting operation member 61 is operated so that one of the slower gear-shifting sprockets 41 to 46, for example the gear-shifting sprocket 41, is selected as a working sprocket, in order to change the gear-shifting position from the aforementioned basic position, the inner cable 62b operates the parallelogram link mechanism 73 of the derailer 70. Accordingly, the parallelogram link mechanism 73 causes the holder H, the guide pulley 72, the arm R and the tension pulley 82 to move leftwards in the axis direction and outwards in the radial direction from the centerline L3 of rotation. Then, the holder, the guide pulley 72, the arm R and the tension pulley 82 occupy a first gear-shifting position which is a gear-shifting position as shown by long dashed double-short dashed lines in FIGS. 2 to 4. A tension force on the chain C, which moves leftwards along with the guide pulley 72 and the tension pulley 82, causes the drive input sprocket 32 to move leftwards in the axis direction along the main shaft 12a of the crankshaft 12. Accordingly, the drive input sprocket 32 occupies a position as shown by long dashed double-short dashed lines in FIGS. 3 and 4. At this time, the chain C is hooked to the gear-shifting sprocket 41, and the gear-shifting sprocket 41 is connected to the drive input sprocket 32 through the chain C while being driven.

In addition, if the gear-shifting operation member 61 is operated in a way that one of the gear-shifting sprockets 42 to 47 which is located in a faster gear-shifting position than the first gear-shifting position is selected, the inner cable 62b operates the parallelogram link mechanism 73 of the derailer 70. Accordingly, the parallelogram link mechanism 73 causes the holder H, the guide pulley 72, the arm R and the tension pulley 82 to move rightwards in the axis direction and inwards in the radial direction toward the centerline L3 of rotation. The tension force on the chain C which moves rightwards along the guide pulley 72 and the tension pulley 82 causes the drive input sprocket 32 to move rightwards along the main shaft 12a. Concurrently, the chain C is hooked to a gear-shifting sprocket which has been selected out of the gear-shifting sprockets 42 to 47.

In this manner, the derailer 70 which is operated in response to the gear-shifting operation through the gear-shifting operation mechanism 60 changes the chain C from one sprocket to another in the gear-shifting sprocket 41 to 47. Accordingly, the bicycle B runs with a gear-shifting ratio which is determined by the selected working sprocket and the drive input sprocket 32, both of which the chain C is hooked to.

In addition, if a gear-shifting operation is performed through the gear-shifting operation member 60, for example when the gear-shifting sprockets 41 to 47 rotate backwards while the bicycle B is in a state of running backwards, or when the gear-shifting sprockets 41 to 47 is halted while the bicycle B is stopped, in other words when the gear-shifting sprockets 41 to 47 are not making a forward rotation, the chain C may come off the orbital plane P1 of the guide pulley 72 in some cases, or off the orbital plane P2 of the tension pulley 82 in other cases. In such cases, the derailed parts C11, C12, C13 and C14 may be formed.

For those occasions, the engagement recovering means for causing the derailed parts C11 and C13 of the chain C, which has been derailed from the orbital plane P1 of the guide pulley 72, to engage with the guide pulley 72 includes the extending 106 and the peripheral wall 80a of the spring containing part 80, which are arranged in the axis direction respectively leftward and rightwards of the orbital plane P1 of the guide pulley 72, and which extend in the axis direction in the respective directions away from the orbital plane P1. Accordingly, the extending part 106 and the peripheral wall 80a respectively guide the derailed parts C11 and C13, which have gone respectively onto the extending part 106 and the peripheral wall 80a, in a way that the derailed parts C11 and C13 slide respectively on the extending part 106 and the peripheral wall 80a towards the orbital plane P1, and engage with the guide pulley 72, due to the tension force on the chain C which occurs when the gear-shifting sprockets 41 to 47 rotate forwards.

Accordingly, even if the chain C comes off the orbital plane P1 due to the movement of the guide pulley 72 and the tension pulley 82 in the axis direction by a gear-shifting operation while the gear-shifting sprockets 41 to 47 are rotating backwards or halted, the derailed parts C11 and C13 are guided respectively by the extending part 106 and the peripheral wall 80a in a way that the derailed parts C11 and C13 slide respectively on the guide surface 107 of the extending part 106 and the guide surface 80b of the peripheral wall 80a and thereafter engage with the guide pulley 72 again, when the extending part 106 and the peripheral wall 80a cause the guide pulley 72 and the tension pulley 82 to move leftwards or rightwards in the axis direction. For this reason, when the gear-shifting sprockets 41 to 47 rotate forward, the derailed parts C11 and C13 are prevented from getting stuck respectively between the guide pulley 72 and the first arm 100 and between the guide pulley 72 and the second arm 120. In addition, the derailed parts C11 and C13 are prevented from being positioned sideward of the guide pulley 72 and in the radial direction inwards from the rotation track 72c of the guide pulley 72. This enables the chain C to run. Consequently, even if a gear-shifting operation is performed when the gear-shifting sprockets 41 to 47 are rotating backwards while the bicycle B is running backwards, the chain C does not get stuck between the guide pulley 72 and the group of the gear-shifting sprockets 41 to 47 (in other words, the chain C does not stagnate). When the gear-shifting sprockets 41 to 47 rotate forward, the chain C returns to an engaged state with the guide pulley 72 securely.

As a result of this, the derailed parts C11 and C13 easily return to the state of engaging with the guide pulley 72. A gear-shifting operation can be performed no matter how the gear-shifting sprockets 41 to 47 rotate, including a case where the gear-shifting sprockets 41 to 47 are not rotating forward, such as a case where the gear-shifting sprockets 41 to 47 are rotating backwards. Accordingly, a gear-shifting can be carried out on the basis of the gear-shifting operation.

The aforementioned pulley support member includes the first holder part 76 and the second holder part 77 as well as the first arm part 100 and the second arm part 120. The first holder part 76 and the second holder part 77 rotatably support the guide pulley 72 with the supporting part 78 interposed therebetween. The first arm part 100 and the second arm part 120 rotatably support the tension pulley 82, which is supported by the supporting part 78 of the holder H, and which applies a tension force onto the chain C, with the supporting part 84 interposed therebetween. The extending part 106 is molded integrally with the first arm part 100. The peripheral wall 80a is a peripheral wall of the spring containing part 80 for containing the tension spring 83 which generates a spring force with which to push the tension pulley 82 against the chain C. Thus, the extending part 106 and the peripheral wall 80a are provided by use of the first arm part 100 and the spring containing part 80 which are a member supporting the tension pulley 82. This requires no member specialized for constituting the extending part 106 and the peripheral wall 80a to be prepared. Accordingly, the number of parts in the gear-shifting apparatus T including the engagement recovering means is inhibited from increasing, and costs for the gear-shifting apparatus T is reduced.

The extending part 106, which has been formed by folding, is formed in a way that the extending part 106 has the guide surface 107 which extends smoothly into the surfaces 104b and 105b opposite to the guide pulley 72 respectively in the two outer peripheral edge parts 104 and 105. This causes the derailed part C11 to move on the guide surface 107 smoothly, and to return to an engaged state with the guide pulley 72. In this manner, promptness and reliability in which the derailed part C11 returns to the state of engaging with the guide pulley 72 is improved, and accordingly promptness and reliability in which the gear-shifting is carried out is improved.

The gear-shifting sprockets 41 to 47 arranged in a way that a gear-shifting sprocket with a larger diameter is sequentially leftward in the axis direction from a gear-shifting sprocket with a smaller diameter. The extending part 106 and the peripheral wall 80a are arranged respectively leftwards and rightwards from the orbital plane P1. The guide surface 107 of the extending part 106 onto which the derailed part C11 can go is arranged in a position whose distance d1 from the centerline L4 of rotation of the guide pulley 72 is smaller in comparison with the guide surface 80b of the peripheral wall 80a onto which the derailed part C13 can go. This eliminates interference between the extending part 106 and each of the gear-shifting sprockets 41 to 47 while the guide pulley 72 is moving leftwards. Accordingly, reliability in which a gear-shifting operation is performed is secured. In addition, the guide pulley 72 and each of the gear-shifting sprockets 41 to 47 can be arranged so as to be closer to each other. This enables the gear-shifting apparatus T to be miniaturized. Furthermore, reliability in which a gear-shifting operation is performed is improved. Additionally, this enables a gear-shifting to be carried out smoothly.

The extending part 106 is provided so as to extend continuously from the guide-pulley-side guide part 101 to a position which makes the linking part 103 seem to overlap with the tension pulley 82 when viewed from the side. The width W3 in the axis direction of the extending part 106 is almost equal to the width W4 in the axis direction of the chain C. This causes the extending part 106 to function as a reinforcement rib for the first arm part 100. For this reason, rigidity of the first arm part 100 supporting the tension pulley 82 is increased. In addition, the guiding function of returning the derailed part C11 to engagement with the guide pulley 72 is secured. Furthermore, the width in the axis direction of the extending part 106 can be made smaller. This enables the extending part 106 to be miniaturized in the axis direction. This enables the guide pulley 72 and each of the gear-shifting sprockets 41 to 47 to be arranged so as to be closer to each other in the axis direction. Consequently, the gear-shifting apparatus T can be miniaturized in the axis direction.

The arm R includes the first arm part 100 and the second arm part 120. The first arm part 100 is arranged leftwards in the axis direction from the orbital planes P1 of the guide pulley 72 and from the orbital plane P2 of the tension pulley 82. The second arm part 120 is arranged rightwards in the axis direction from the orbital planes P1 of the guide pulley 72 and from the orbital plane P2 of the tension pulley 82. The first arm part 100 is provided with the extending part 106, and the second arm part 120 is provided with the peripheral wall 80a of the spring containing part 80 in a way that the peripheral wall 80a is close to the second arm part 120 in the axis direction. The second arm part 120 is arranged in the axis direction between the guide pulley 72 and the peripheral wall 80a, and the outermost edge 124a is a part of the second arm part 120 in the radial direction. The distance d2 of the outermost edge 124a from the centerline L4 of rotation of the guide pulley 72 is equal to the distance d2 of the guide surface 80b of the peripheral wall 80a from the centerline L4 of rotation of the guide pulley 72. Accordingly, the derailed part C13 is guided by the peripheral wall 80a so that the derailed part C 13 moves on the guide surface 80b smoothly without being interfered by the second arm part 120. Thus, the derailed part C13 can return to the state of engaging with the guide pulley 72. Consequently, the promptness and reliability in which the derailed part C13 returns to the state of engaging with the guide pulley 72 are improved. Moreover, the promptness and reliability in which a gear-shifting is carried out are improved. Furthermore, since the inclined surface 125 is formed in the outer peripheral edge part 124 of the guide-pulley-side guide part 121 in the second arm part 120, it is easier for the derailed part C13, which has moved on the guide surface 80b, to engage with the guide pulley 72.

The width W3 of the extending part 106 is almost equal to the width W5 occupied in the axis direction by two gear-shifting sprockets which are adjacent to each other in the axis direction. The width W8 in the axis direction of the peripheral wall 80a is larger than the width W3 of the extending part 106. Accordingly, a guiding function of causing the derailed parts C11 and C13 to return to the state of engaging with the guide pulley 72 is secured due to the extending part 106 and the peripheral wall 80a. In addition, the width W3 in the axis direction of the first extending part 106 can be made smaller. This enables the extending part 106 to be miniaturized in the axis direction. In addition, the guide pulley 72 and each of the gear-shifting sprockets 41 to 47 can be arranged so as to be closer to each other in the axis direction. This enables the gear-shifting apparatus T to be miniaturized in the axis direction. Furthermore, even if the width in which the derailed part C13 moves in the axis direction is larger, the peripheral wall 80a can cause the derailed part C13 to return to the state of engaging with the guide pulley 72 in a way that the derailed part C13 securely goes onto the peripheral wall 80a. Accordingly, the reliability with which the derailed part C13 returns to the state of engaging with the guide pulley 72 is improved. Additionally, the reliability with which a gear-shifting is carried out is improved.

If the extending part 106 of the smaller-diameter outer peripheral edge part 105 is positioned in the radial direction inwards from the extending part 106 of the larger-diameter outer peripheral edge part 104, and if the extending part 106 of the smaller-diameter outer peripheral edge part 105 is positioned closer to the centerline L4 of rotation, the extending part 106 of the smaller-diameter outer peripheral edge part 105 causes the derailed part C11 to return to the state of engaging with the guide pulley 72 in a way that the derailed part C11 securely goes onto the extending part 106 without causing the derailed part C11 to come off from the extending part 106, even when a difference in outer diameter between a gear-shifting sprocket which is in operation after a gear-shifting and a gear-shifting sprocket which was in operation before the gear-shifting is larger when a gear-shifting operation changes the chain C to a faster gear-shifting position. Accordingly, the reliability with which the derailed part C13 returns to the state of engaging with the guide pulley 72 is improved. Additionally, the reliability with which a gear-shifting is carried out is improved.

The first arm part 100 and the second part 120 are provided respectively with the engagement recovery-guiding parts 110 and 130 near the part of the tension pulley 82 which leads in the chain C. The engagement recovery-guiding part 110 causes the derailed part C12 of the chain C, which has been derailed from the orbital plane P2 of the tension pulley 82, to engage with the tension pulley 82. The engagement recovery-guiding part 130 causes the derailed part C 14 of the chain C, which has been derailed from the orbital plane P2 of the tension pulley 82, to engage with the tension pulley 82. The engagement recovery-guiding part 110 guides the entire derailed part C12 in a way that the engagement recovery-guiding part 110 positions the entire derailed part C12 in the radial direction outwards from the rotation track 82c of the tension pulley 82, and in a way that the engagement recovery-guiding part 110 causes the entire derailed part C12 to move towards the orbital plane P2 due to the tension force on the chain C and to thereafter engage with the tension pulley 82. The engagement recovery-guiding part 130 guides the entire derailed part C14 in a way that the engagement recovery-guiding part 130 positions the entire derailed part C14 in the radial direction outwards from the rotation track 82c of the tension pulley 82, and in a way that the engagement recovery-guiding part 130 causes the entire derailed part C14 to move towards the orbital plane P2 due to the tension force on the chain C and to thereafter engage with the tension pulley 82.

Accordingly, the derailed parts C12 and C14 of the chain C are guided respectively by the engagement recovery-guiding parts 110 and 130, and thus return to engagement with the tension pulley 82, even if the chain C comes off from the orbital plane P2 due to movement of the tension pulley 82 in the axis direction by a gear-shifting operation when the gear-shifting sprockets 41 to 47 are not rotating forward, including a case where the gear-shifting sprockets 41 to 47 are in a halt, especially when the gear-shifting sprockets 41 to 47 are in halt. This prevents the derailed parts C 12 and C 14 from getting stuck respectively between the tension pulley 82 and the first arm part 100 and between the tension pulley 82 and the second arm part 120. In addition, this prevents the derailed parts C12 and C14 from being positioned respectively leftwards and rightwards from the tension pulley 82 as well as inwards in the radial direction from the rotation track 82c of the tension pulley 82. Thus, the chain C can run. As a result of this, the derailed parts C12 and C14 which have been derailed from the orbital plane P2 of the tension pulley 82 due to the gear-shifting operation are guided respectively by the engagement recovery-guiding parts 110 and 130 so that the derailed parts C12 and C14 engage with the tension pulley 82 again. Thus, the chain C can run. This makes it easier for the derailed parts C12 and C14 to return to the state of engaging with the tension pulley 82. In this manner, a gear-shifting operation can be performed while the gear-shifting sprockets 41 to 47 are in the state of being not rotating forward, including the state of being halted. Accordingly, a gear-shifting can be carried out on the basis of the gear-shifting operation.

The derailer 70 includes the guide pulley 72 and the holder H. The guide pulley 72 guides the chain C hooked to one working sprocket, which has been selected out of the gear-shifting sprockets 41 to 47. The holder H rotatably supports the guide pulley 72, and can move in the axis direction along with the arm R. The arm R includes the pair of arm parts 100 and 120. The arm part 100 is arranged in the axis direction leftwards from the tension pulley 82 and the guide pulley 72. The arm part 120 is arranged in the axis direction rightwards from the tension pulley 82 and the guide pulley 72. The tension-pulley-side guide part 102 and the guide-pulley-side guide part 101 are formed in the arm part 100. The tension-pulley-side guide part 122 and the guide-pulley-side guide part 121 are formed in the arm part 120. The tension-side-pulley guide parts 102 and 122 prevent the part of the chain C, which is hooked to the tension pulley 82, from coming off from the tension pulley 82. The guide-pulley-side guide parts 101 and 121 are the supported parts which are supported by the holder H. The interval W1 in the axis direction between the two guide-pulley-side guide parts 101 and 121 is larger than the interval W2 in the axis direction between the two tension-pulley-side guide parts 102 and 122.

This can increase bending rigidities respectively of the guide-pulley-side guide parts 101 and 121 which are parts onto which a force to move the arm R in the axis direction functions from the derailer 70. Accordingly, the guide-pulley-side guide parts 101 and 121 can be made lighter in weight. In addition, if the interval in the axis direction between the tension-pulley-side guide parts 102 and 122 of the arm R were made smaller, the tension-pulley-side guide parts 102 and 122 can be arranged so as to be closer to the tension pulley 82. This enables the derailed parts C12 and C14, which are guided respectively by the engagement recovery-guiding parts 110 and 130, to securely return to the state of engaging with the tension pulley 82. Consequently, the reliability with which the derailed parts C12 and C14 return to engagement with the tension pulley 82 is improved.

The ranges in which the respective engagement recovery-guiding parts 110 and 130 are formed in the circumferential direction is a range which makes the angle θ1 to the center plane P3 in the forward rotational direction A0 of the tension pulley 82 around the centerline of rotation of the tension pulley 82 almost equal to the angle θ2 to the center plane P3 in the backward rotational direction of the tension pulley 82 around the centerline of rotation of the tension pulley 82 when viewed from the side. Accordingly, the ranges in which respectively the engagement recovery-guiding parts 110 and 130 are formed in the circumferential direction can be secured sufficiently. This makes it easier for the derailed parts C12 and C14 to return to engagement with the tension pulley 82. Thus, reliability in which the derailed parts C12 and C14 return to engagement with the tension pulley 82 is improved. Furthermore, points of application in the engagement recovery-guiding parts 110 and 130 on which respectively the derailed parts C12 and C14 in contact with the engagement recovery-guiding parts 110 and 130 function the respective forces can be made closer to the center plane P3. Torques which the forces cause to function respectively on the arm parts 100 and 120 can be reduced. This does not require the arm parts 100 and 120 to be bulky or to accordingly increase in weight for the purpose of improving torsion rigidities respectively of the arm parts 100 and 120. Thus, the arm parts 100 and 120 can be made lighter in weight.

The arm R includes the pair of arm parts 100 and 120. The arm part 100 is arranged in the axis direction leftwards from the tension pulley 82, and the engagement recovery-guiding part 110 is formed in the arm part 100. The arm part 120 is arranged in the axis direction rightwards from the tension pulley 82, and the engagement recovery-guiding part 130 is formed in the arm part 120. The engagement recovery-guiding parts 110 and 130 have the guide surfaces 112 and 132 respectively. The derailed parts C12 and C14 come into contact with the guide surfaces 112 and 132 respectively. The guide surface 112 extends leftwards in the axis direction and in a direction away from the orbital plane P2. The guide surface 132 extends rightwards in the axis direction and in a direction away from the orbital plane P2. In the guide surface 112, the end part 112a is the closest to the tension pulley 82 in the axis direction. In the guide surface 132, the end part 132a is the closest to the tension pulley 82 in the axis direction. The end parts 112a and 132a are located in almost the same position as the inner peripheral edge C4a of the chain C which engages with the tension pulley 82 is located. This causes the derailed parts C12 and C14 to easily go onto the guide surfaces 112 and 132 respectively. The starting parts C12a and C14a respectively of the derailed parts C12 and C14 are located respectively in positions in the forward rotational direction A0 of the tension pulley 82 respectively in the engagement recovery-guiding parts 110 and 130, and respectively near the derailment prevention parts 111 and 131. Accordingly, the starting parts C12a and C14a can be positioned in a part as far away from a part of the drive input sprocket 32 which leads out the chain C as possible. This reduces a degree of torsion of the chain C, which is caused due to the movement of the tension pulley 82 in the axis direction. This reduces a resistance force stemming from the chain C when a gear-shifting operation is performed. As a result of this, the resistance force stemming from the chain C due to the torsion of the chain C is reduced. Thus, the gear-shifting operation can be performed more easily.

The case part 21 of the gear-shifting apparatus T is provided with the protruding part 56 in a position which makes the protruding part 56 seem to overlap with the part C1 of the chain C which is hooked to a gear-shifting sprocket when viewed from the side. The part C1 engages with the gear-shifting sprocket 41 which is a neighboring sprocket next to the case 20 in the axis direction out of the gear-shifting sprockets 41 to 47. The protruding part 56 regulates the movement of the chain C in the axis direction in terms of a direction near to the first case part 21. The protruding part 56 prevents the chain C from coming off from the gear-shifting sprocket 41 by means of contact of the protruding part 56 with the chain C. Accordingly, the protruding part 56 prevents the chain C from moving in the axis direction beyond the gear-shifting sprocket 41 while a gear-shifting operation is being performed on the gear-shifting sprocket 41. In this manner, the chain C will not come off from the gear-shifting sprocket 41. This does not require the positions in the axis direction respectively of the chain C and guide pulley 72 to be set, with higher precision, in response to the a gear-shifting position on the basis of a gear-shifting operation. Consequently, the simple configuration prevents the chain C from coming off from the gear-shifting sprocket 41 due to a rapid gear-shifting operation.

The protruding part 56 is molded integrally with the first case part 21 in a way that the protruding part 56 protrudes in the axis direction towards the part C1 of the chain C which is hooked to a gear-shifting sprocket. This does not require preparation of a specialized member for constituting the protruding part 56. Accordingly, the number of the parts of the gear-shifting apparatus T is reduced, and the costs for the gear-shifting apparatus T is also reduced. In addition, the gear-shifting apparatus T is made lighter in weight.

The first case part 21 is provided with the inner rib 57 in such a way that the inner rib 57 protrudes in the axis direction. The inner rib 57 extends outwards in the radial direction of the gear-shifting sprocket 41 from the protruding part 56. The top surface 57a in the axis direction of the inner rib 57 is located in almost the same position as the top surface 56d of the protruding part 56 which regulates the movement of the chain C in the axis direction by means of its contact with the chain C is located. Accordingly, the inner rib 57 increases the rigidity of the first case part 21 more. In addition, even when a part of the chain C extends outwards in the radial direction beyond the protruding part 56, the part of the chain C which extends outwards is prevented from moving in the axis direction beyond the protruding part 56. Accordingly, an effect of preventing the chain from being derailed is improved more.

The protruding part 56, the inner rib 57 and the outer rib 58 are molded integrally with the first case part 21 made of a plate-shaped material. For this reason, the rigidity of the first case part 21 is improved.

In addition, the protruding part 56 is provided with the second part 56b. Accordingly, the protruding part 56 prevents the chain C from moving in the axis direction beyond the gear-shifting sprocket 41 even when a gear-shifting operations is performed on the gear-shifting sprocket 41 while the stagnant part C2 is formed on the chain C. Thus, the chain C will not come off the gear-shifting sprocket 41.

Hereinbelow, descriptions will be provided for examples of partial modifications in the aforementioned embodiment, focusing on the modified configurations.

The case of the gear-shifting apparatus T may be made of synthetic resin. The above described case is one in which the chamber for containing the gear-shifting mechanism M1, the derailer 70 and the tensioner 74 is hermetically formed. Instead, the case may be a case in which a containing chamber is formed open to the external air, including a case which, for example, covers at least the left portion in the axis direction of the sprocket cluster 40.

The extending part 106 may tilt in a way that the extending part 106 extends in the axis direction and in a direction away from the orbital plane P1 as the extending part 106 goes outwards in the radial direction. Otherwise, the guide surface 107 may tilt in a way that the guide surface 107 extends in the axis direction and in a direction away from the orbital plane P1 as the guide surface 107 goes outwards in the radial direction. The extending part 106 may be molded integrally with the first arm part 100 through a milling-out process or a casting process. The engagement recovery-guiding parts 110 and 130 may be molded integrally with the first arm part 100 and the second arm part 120 respectively through a milling-out process or a casting process. The engagement recovering parts 110 and 130 may extend in parallel with the centerline L5 of rotation. Otherwise, the guide surfaces 112 and 132 may extend in parallel with the centerline L5 of rotation.

The outermost edge 124a of the outer peripheral edge part 124 in the second arm part 120 may be located in a position whose distance from the centerline L4 of rotation is smaller than the distance d2.

The protruding part may be formed in parts in the circumferential direction or in the radial direction.

In the case of the aforementioned embodiment, the commonly-used sprocket includes the drive input sprocket 32, and the gear-shifting sprockets 41 to 47 are constituted of driven sprockets. However, a plurality of gear-shifting sprockets may be constituted of a plurality of drive sprockets. The commonly-used sprocket may be constituted of a driven sprocket while the chain for a gear-shifting is hooked between the commonly-used sprocket and one of the gear-shifting sprockets.

The sprockets cluster may be provided to the output axle, which is provided in the same axis as the centerline of rotation of the rear wheel, and the sprocket cluster may be constituted of driven sprockets for output. The gear-shifting apparatus T may be provided to machines other than bicycles.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A gear-shifting apparatus which comprises:
a chain;
a plurality of gear-shifting sprockets arranged in an axis direction; and
a changing mechanism for changing the chain from one of the plurality of gear-shifting sprockets to a selected other one of the plurality of gear-shifting sprockets in response to a gear-shifting operation, the changing mechanism comprising:
a guide pulley which is movable in the axis direction and which is operable to guide the chain to the selected other one of the plurality of gear-shifting sprockets,
and a pulley support member which rotatably supports the guide pulley to which the chain is wound, and which is movable in the axis direction by means of the gear-shifting operation, the pulley support member comprising:
a first arm part disposed on a first side of the pulley,
a second arm part disposed on a second side of the pulley,
a spring-containing part operatively attached to the second arm part, and
a pulley axle which extends through the first arm part, the second arm part, the pulley and the spring-containing part;
wherein the pulley support member is provided with engagement recovery parts for causing a derailed portion of the chain, which has been derailed from an orbital plane of the guide pulley, to engage with the guide pulley,
wherein the engagement recovery parts include a first extending part and a second extending part, which are arranged respectively on two sides in the axis direction of the orbital plane of the guide pulley, and which each extend in a respective direction away from the orbital plane of the guide pulley, the first extending part being integrally formed with the first arm part of the pulley support member, and the second extending part being integrally formed with the spring-containing part, the engagement recovery-guiding parts configured to be substantially symmetrical to one another as seen in cross-section, and to diverge outwardly away from one another at a distal end of the arm adjacent to the tension pulley; and wherein each of the extending parts is operable to guide a derailed portion of the chain, which has gone onto the extending part, in a way that the derailed portion of the chain slides on the extending part, moves towards the orbital plane of the guide pulley, and thereafter engages with the guide pulley, due to a tension force on the chain.

2. The gear-shifting apparatus according to claim 1, wherein the gear-shifting apparatus comprises a tension pulley, wherein the pulley support member includes a holder for rotatably supporting the guide pulley, and an arm for rotatably supporting the tension pulley which is supported by the holder, and which applies a tension force to the chain, wherein the first extending part is molded integrally with the arm.

3. The gear-shifting apparatus according to claim 1, wherein the plurality of gear-shifting sprockets are sequentially arranged in a way that a gear-shifting sprocket with a larger outer diameter comes next to a gear-shifting sprocket with a smaller outer diameter on a side in the axis direction, wherein the first extending part and the second extending part are arranged respectively at the side of the orbital plane of the guide pulley and on opposed sides in the axis direction, and wherein a guide surface onto which the derailed part can go in the first extending part is located in a position whose distance from a centerline of rotation of the guide pulley is smaller in comparison with the guide surface onto which the derailed part can go in the second extending part.

4. The gear-shifting apparatus according claim 2, wherein the first extending part is provided so as to extend into a position which makes the first extending part seem to overlap with the tension pulley when viewed from a side, and wherein a width in the axis direction of the first extending part is almost equal to a width in the axis direction of the chain.

5. The gear-shifting apparatus according to claim 2, wherein one of the first arm part and the second arm part, is arranged in the axis direction on a first side respectively of the orbital planes of both the guide pulley and the tension pulley, the other of which is arranged in the axis direction on a second side respectively of the orbital planes of both the guide pulley and the tension pulley, wherein the first arm part is provided with the first extending part, wherein the second arm part is provided with the spring-containing part so that the spring-containing part is next to the second arm part in the axis direction, and wherein, while the second arm part is arranged in the axis direction between the guide pulley and the spring-containing part, an outermost edge of the second arm part in the radial direction is located in a position whose distance from a centerline of rotation of the guide pulley is equal or smaller in comparison with a guide surface onto which the derailed part can go in the spring- containing part.

6. The gear-shifting apparatus according to claim 5, wherein a width in the axis direction of the first extending part is almost equal to a width occupied in the axis direction by two gear-shifting sprockets of the plurality of gear-shifting sprockets which are adjacent to one another in the axial direction, and wherein a width in the axis direction of the second extending part is larger than the width in the axis direction of the first extending part.

7. A gear-shifting apparatus comprising:

a chain;

a plurality of gear-shifting sprockets arranged in an axis direction; and a changing mechanism for changing the chain from one of the plurality of gear-shifting sprockets to a selected one of the plurality of gear-shifting sprockets in response to a gear-shifting operation, the changing mechanism comprising:

a tension pulley for applying a tension force to the chain, an arm which rotatably supports the tension pulley, the arm moving in the axis direction due to the gear-shifting operation, wherein, near a part of the tension pulley which leads in the chain, the arm is provided with engagement recovery-guiding parts for respectively causing derailed parts of the chain, which are derailed from an orbital plane of the tension pulley, to engage with the tension pulley, the engagement recovery-guiding parts configured to be substantially symmetrical to one another as seen in cross-section, and to diverge outwardly away from one another at a distal end of the arm adjacent to the tension pulley; and wherein the engagement recovery-guiding parts respectively guide the derailed parts in such a way that the entire derailed parts are positioned outwards in the axis direction from a rotation track of an outermost peripheral edge of the tension pulley, and in a way that the derailed parts move towards the orbital plane of the tension pulley due to the tension force on the chain and thereafter engage with the tension pulley.

8. The gear-shifting apparatus according to claim 7, wherein the changing mechanism further comprises:

a guide pulley for guiding the chain hooked to the selected one of the plurality of gear-shifting sprockets; and a holder which rotatably supports the guide pulley, and which can move in the axis direction along with the arm, wherein the arm includes a pair of arm parts, one of which is arranged on a first side respectively of both the tension pulley and the guide pulley in the axis direction, and the other of which is arranged on a second side respectively of both the tension pulley and the guide pulley in the axis direction, wherein, each of the arm parts comprises a tension-pulley-side guide part for preventing a part of the chain, which is hooked to the tension pulley, from coming off, and supported parts which are supported by the holder, and wherein an interval in the axis direction between the two supported parts is larger than an interval in the axis direction between the two tension-pulley-side guide parts.

9. The gear-shifting apparatus according to claim 8, wherein, a center plane is defined as the plane which includes both a centerline of rotation of the tension pulley and a centerline of rotation of the guide pulley, and wherein a range in a circumferential direction where each of the engagement recovery-guiding parts is formed is the range which comprises a first angle in a forward rotational direction about the centerline of rotation of the tension pulley with respect to the center plane almost equal to a second angle in a backward rotational direction about to the centerline of rotation of the tension pulley with respect to the center plane when viewed from the side.

10. The gear-shifting apparatus according to claim 7,
wherein the arm includes a pair of arm parts, which are arranged respectively on opposed sides in the axis direction with respect to the tension pulley, and in which the engagement recovery-guiding parts are formed respectively,
wherein each of the engagement recovery-guiding parts includes a guide surface with which one of the derailed part comes into contact, and which extend in the axis direction and in a direction away from the orbital plane, and
wherein an end part which is the closest to the tension pulley in the axis direction in each of the guide surfaces is located in almost the same position as an inner peripheral edge of the chain engaging with the tension pulley is located.

11. A gear-shifting apparatus which comprises:
a chain;
a plurality of gear-shifting sprockets arranged in an axis direction; and
a changing mechanism for changing the chain from one of the plurality of gear-shifting sprockets to a selected one of the plurality of gear-shifting sprockets in response to a gear-shifting operation,
the changing mechanism comprising:
a guide pulley which moves in the axis direction and guides the chain hooked to the selected one of the plurality of gear-shifting sprockets, the guide pulley defining an orbital plane of the guide pulley,
a pulley support member which rotatably supports the guide pulley to which the chain is wound, and which moves in the axis direction by means of the gear-shifting operation, the pulley support member comprising:
a first arm part disposed on a first side of the pulley,
a second arm part disposed on a second side of the pulley,
a spring-containing part operatively attached to the second arm part, and
a pulley axle which extends through the first arm part, the second arm part, the pulley and the spring-containing part;
a tension pulley for applying a tension force to the chain, and
an arm which rotatably supports the tension pulley, the arm moving in the axis direction due to the gear-shifting operation,
wherein the pulley support member is provided with engagement recovery parts for causing a derailed portion of the chain, which has been derailed from an orbital plane of the guide pulley, to engage with the guide pulley, wherein the engagement recovery parts include a first extending part and a second extending part which are arranged respectively on two sides in the axis direction of the orbital plane of the guide pulley, and which each extend in a respective direction away from the orbital plane of the guide pulley, the first extending part being integrally formed with the first arm part of the pulley support member, and the second extending part being integrally formed with the spring-containing part, the engagement recovery-guiding parts configured to be substantially symmetrical to one another as seen in cross-section, and to diverge outwardly away from one another at a distal end of the arm adjacent to the tension pulley; and
wherein the arm is provided with engagement recovery-guiding parts for respectively causing derailed parts of the chain, which are derailed from an orbital plane of the tension pulley, to engage with the tension pulley.

12. The gear-shifting apparatus according to claim 11,
wherein each of the extending parts guides the derailed portion of the chain, which has gone onto the extending part, in a way that the derailed portion of the chain slides on the extending part, moves towards the orbital plane of the guide pulley, and thereafter engages with the guide pulley, due to the tension force on the chain.

13. The gear-shifting apparatus according to claim 11, wherein the arm is provided with engagement recovery-guiding parts near a part of the tension pulley which leads in the chain, and
wherein the engagement recovery-guiding parts respectively guide the derailed parts in a way that the entire derailed parts are positioned outwards in the axis direction from a rotation track of an outermost peripheral edge of the tension pulley, and in a way that the derailed parts move towards the orbital plane of the tension pulley due to the tension force on the chain and thereafter engage with the tension pulley.

14. The gear-shifting apparatus according to claim 11, wherein the gear-shifting apparatus is enclosed within a case, and wherein the changing mechanism further comprises a link mechanism which is rotatably secured at one end to the case, and is secured at a second end to the holder, the link mechanism being operative to move the holder and the guide pulley both in the axis direction and in a direction substantially normal to the axis direction in response to a gear-shifting operation.

15. The gear-shifting apparatus according to claim 14, wherein the link mechanism comprises a pair of elongate links.

16. A transmission apparatus for a bicycle, comprising:
a hollow housing;
a crankshaft extending through said hollow housing and being rotatably supported thereon;
a drive input sprocket operatively attached to said crankshaft and concurrently rotatable therewith, said drive input sprocket disposed inside of said housing;
an output axle having a gear-supporting portion disposed in said hollow housing and rotatably supported thereon, said output axle having a central axis and further comprising an outer end portion extending outwardly from said housing;
a plurality of spaced apart gear-shifting sprockets operatively attached to said output axle and concurrently rotatable therewith, said gear sprockets disposed inside of said housing;
a chain extending between said drive input sprocket and a selected one of said gear-shifting sprockets
a drive output sprocket operatively attached to the outer end portion of said output axle and being concurrently rotatable therewith, said drive output sprocket disposed outside of said housing;
a changing mechanism for changing the chain from one of the plurality of gear-shifting sprockets to a selected other one of the plurality of gear-shifting sprockets in response to a gear-shifting operation, the changing mechanism comprising:
a guide pulley which is movable through an orbital plane in a direction substantially parallel to the central axis of the output axle and which is operable to guide the chain to another selected one of the plurality of gear-shifting sprockets, and a pulley support member which rotatably supports the guide pulley to which the chain is wound, and which is movable in the axis direction by means of the gear-shifting operation, the pulley support member comprising:

a first arm part disposed on a first side of the pulley, a second arm part disposed on a second side of the pulley, a spring-containing part operatively attached to the second arm part, and a pulley axle which extends through the first arm part, the second arm part, the pulley and the spring-containing part;

wherein the pulley support member is provided with engagement recovery parts for helping guide a derailed portion of the chain to engage with the guide pulley if a portion of the chain becomes derailed from an orbital plane of the guide pulley, the engagement recovery parts comprising first and second extending parts arranged on opposite sides of the orbital plane of the guide pulley, the first extending part being integrally formed with the first arm part of the pulley support member, and the second extending part being integrally formed with the spring-containing part, the engagement recovery-guiding parts configured to be substantially symmetrical to one another as seen in cross-section, and to diverge outwardly away from one another at a distal end of the arm adjacent to the tension pulley.

17. A bicycle incorporating the gear-shifting apparatus of claim 1.

18. A bicycle incorporating the transmission apparatus of claim 16.

19. The gear-shifting apparatus of claim 11, wherein the engagement recovery-guiding parts are configured to be substantially symmetrical to one another as seen in cross-section, and to diverge outwardly away from one another at a distal end of the arm.

\* \* \* \* \*